United States Patent
Panwar et al.

(10) Patent No.: US 12,229,302 B1
(45) Date of Patent: Feb. 18, 2025

(54) REVOCABLE AND TRACEABLE BLOCKCHAIN REWRITES USING ATTRIBUTE-BASED CRYPTOSYSTEMS

(71) Applicant: Arrowhead Center, Inc., Las Cruces, NM (US)

(72) Inventors: Gaurav Panwar, Las Cruces, NM (US); Roopa Vishwanathan, Las Cruces, NM (US); Satyajayant Misra, Las Cruces, NM (US)

(73) Assignee: Arrowhead Center, Inc., Las Cruces, NM (US)

( * ) Notice: Subject to any disclaimer, the term of this patent is extended or adjusted under 35 U.S.C. 154(b) by 279 days.

(21) Appl. No.: 17/683,050

(22) Filed: Feb. 28, 2022

Related U.S. Application Data

(60) Provisional application No. 63/181,568, filed on Apr. 29, 2021.

(51) Int. Cl.
*G06F 21/62* (2013.01)
*H04L 9/00* (2022.01)

(52) U.S. Cl.
CPC ............ *G06F 21/6227* (2013.01); *H04L 9/50* (2022.05)

(58) Field of Classification Search
None
See application file for complete search history.

(56) References Cited

U.S. PATENT DOCUMENTS

| | | | |
|---|---|---|---|
| 9,774,578 B1 * | 9/2017 | Ateniese | G06F 3/0673 |
| 10,296,248 B2 * | 5/2019 | Ateniese | H04L 9/085 |
| 10,715,507 B1 * | 7/2020 | Spears | G06Q 20/405 |
| 2021/0056638 A1 * | 2/2021 | Davis | G06Q 20/3827 |
| 2021/0382620 A1 * | 12/2021 | Fang | G06F 16/9024 |

FOREIGN PATENT DOCUMENTS

WO WO-2019009913 A1 * 1/2019 ......... G06F 16/2379

OTHER PUBLICATIONS

Huang, "Achieving Intelligent Trust-Layer for Internet-of-Things via Self-Redactable Blockchain", IEEE, Apr. 2020, pp. 2677-2685. (Year: 2020).*

Agrawal, Shashank, et al., "FAME: Fast Attribute-Based Message Encryption", Proceedings of the 2017 ACM SIGSAC Conference on Computer and Communications Security, CCS, 2017, 665-682.

(Continued)

*Primary Examiner* — Benjamin E Lanier

(74) *Attorney, Agent, or Firm* — Peacock Law P.C.; Justin R. Jackson

(57) ABSTRACT

Method and apparatus for efficient and authorized rewriting of records already written to a blockchain. Mutable transactions will make a fraction of all blockchain transactions, but will be a necessity to meet the needs of privacy regulations, for example the General Data Protection Regulation. Embodiments of the present invention provide an efficient framework for transaction-level blockchain rewrites that is fine-grained and supports revocation. Embodiments of the present invention provide a novel revocable chameleon hash with ephemeral trapdoor method and/or system, a novel revocable fast attribute-based encryption method and/or system, and a dynamic group signature method and/or system.

16 Claims, 5 Drawing Sheets

(56) References Cited

OTHER PUBLICATIONS

Ateniese, Giuseppe, et al., "Redactable blockchain-or-rewriting history in bitcoin and friends", 2017 IEEE European Symposium on Security and Privacty (EuroS&P), IEEE, 2017, 111-126.

Attrapadung, Nuttapong, et al., "Attribute=Based Encryption Supporting Direct/Indirect Revocation Modes", 12th IMA International Conference, Cryptography and Coding, Proceedings, 2009, 278-300.

Bellare, Mihir, et al., "Foundations of Group Signatures: Formal Definitions, Simplified Requirements, and a Construction Based on General Assumptions", Advances in Cryptology—Eurocrypt Proceedings, 2003, 614-629.

Bellare, Mihir, et al., "Foundations of Group Signatures: The Case of Dynamic Groups", Topics in Cryptology—CT-RSA, Proceedings, 2005, 136-153.

Bentov, Iddo, et al., "Tesseract: Real-Time Cryptocurrency Exchange Using Trusted Hardware", Proceedings of the 2019 ACM SIGSAC Conference on Computer and Communications Security, CCS, 2019, 1521-1538.

Bethencourt, John, et al., "Ciphertext-Policy Attribute-Based Encryption", 2007 IEEE Symposium on Security and Privacy (S&P 2007), 2007, 321-334.

Boldyreva, Alexandra, et al., "Identity-based encryption with efficient revocation", Proceedings of the 2008 ACM CCS, 2008, 417-426.

Bootle, Jonathan, et al., "Foundations of Fully Dynamic Group Signatures", IACR Cryptol. ePrint Arch, http://eprint.iacr.org/2016/368, Downloaded Mar. 29, 2022, 2016, 368.

Business Insider, "The growing list of applications and use cases of blockchain technology in business and life", https://www.businessinsider.com/blockchain-technology-applications-use-cases, Downloaded Mar. 29, 2022, 2020.

Business Wire, "Accenture Editable Blockchain", https://www.businesswire.com/news/home/20160920005551/en/Accenture-Debuts-Prototype-of-%E2%80%98Editable%E2%80%99-Blockchain-for-Enterprise-and-Permissioned-Systems, Downloaded Mar. 29, 2022, 2016.

Camenisch, Jan, et al., "Chameleon-Hashes with Ephemeral Trapdoors- and Applications to Invisible Sanitizable Signatures", Public-Key Cryptography—PKC, Proceedings, Part II, 2017, 152-182.

Chase, Melissa, "Multi-authority Attribute Based Encryption", Theory of Cryptography, 4th Theory of Cryptography Conference, TCC, Proceedings, Salil P. Vadhan (Ed.), 2007, 515-534.

Chow, Sherman S.M., "A framework of Multi-Authority Attribute-Based Encryption with Outsourcing and Revocation", Proceedings of the 21st ACM on Symposium on Access Control Models and Technologies, SACMAT, 2016, 215-226.

Cui, Hui, et al., "Server-Aided Revocable Attribute-Based Encryption", Computer Security—ESORICS, Proccedings, Part II, 2016, 570-587.

Datta, Pratish, et al., "Fully Secure Unbounded Revocable Attribute-Based Encryption in Prime Order Bilinear Groups via Subset Difference Method", IACR Cryptology ePrint Archive, http://eprint.iacr.org/2015/293, Downloaded Mar. 29, 2022, 2015.

Department of Homeland Security, "Blockchain and Suitability for Goverment Applications", https://www.dhs.gov/sites/default/files/publications/2018_AEP_Blockchain_and_Suitablity_for_Government_Applciations.pdf, Downloaded Mar. 29, 2022, 2018.

Derler, David, et al., "Fine-Grained and Controlled Rewriting in Blockchains: Chameleon-Hashing Gone Attribute-Based", 26th Annual Network and Distributed System Security Symposium, NDSS, 2019.

Deuber, Dominic, et al., "Redactable Bockchain in the Permissionless Setting", IEEE Symposium on Security and Privacy, SP 2019, San Francisco, CA., May 19-23, 2019, 124-138, 2019.

Fujisaki, Eiichiro, et al., "Secure Integration of Asymmetric and Symmetric Encryption Schemes", Advances in Cryptology—Crypto, Proceedings, 1999, 537-554.

Goyal, Vipul, et al., "Attribute-based encryption for fine-grained access control of encrypted data", Proceedings of the 13th ACM CCS, 89-98, 2006.

Jhuisi, "Charm: A tool for rapid cryptographic prototyping", http://charm-crypto-io, Downloaded Mar. 29, 2022, 2012.

Krawczyk, Hugo, et al., "Chameleon Signatures", Proceedings of the Network and Distributed System Security Symposium, NDSS, 2000.

Lewko, Allison B., et al., "Fully Secure Functional Encryption: Attribute-Based Encryption and (Hierarchical) Inner Product Encryption", Advances in Cryptology—Eurocrypt, Proceedings, 2010, 62-91.

Libert, Benoit, et al., "Scalable Group Signatures with Revocation", Advances in Cryptology—Eurocrypt, Proceedings, 2012, 609-627.

Medium, "Hundreds of Millions of Dollars Locked at Ethereum 0×0 Address and Smart Contracts' Addresses", https://medium.com/@maltabba/hundreds-of-millions-of-dollars-locked-at-ethereum-0x0-address-and-smart-contracts-addresses-how-4144dbe3458a, Downloaded Mar. 29, 2022, 2018.

Pirretti, Matthew, et al., "Secure attribute-based systems", Proceedings of the 13th ACM Conference on Computer and Communications Security, CCS, 2006, 99-112.

Reuters, "Banks complete 25 million euros securities transaction on blockchain platform", https://uk.reuters.com/article/uk-blockchain-securities/banks-complete-25-million-euros-securities-\transaction-on-blockchain-platform-\idUKKCN1GD4DW, Downloaded Mar. 29, 2022, 2018.

Sahai, Amit, et al., "Dynamic Credentials and Ciphertext Delegation for Attribute-Based Encryption", Advances in Cryptology—Crypto, Proceedings, 2012, 188-217.

Thyagarajan, Sri Aravinda Krishnan, et al., "Reparo: Publicly Verifiable Layer to Repair Blockchains", CoRR abs/2001.00486, http://arxiv.org/abs/2001.00486, Downloaded Mar. 29, 2022, 2020.

Tomida, Junichi, et al., "Fast, compact, and expressive attribute-based encryption", IACR International Conference on Public-Key Cryptopgraphy, Springer, 2020, 3-33.

Waters, Brent, "Ciphertext-Policy Attribute-Based Encryption: An Expressive, Efficient, and Provably Secure Realization", Public Key Cryptography—PKC, Proceedings, 2011, 53-70.

Yu, Shucheng, et al., "Attribute based data sharing with attribute revocation", Proceedings of the 5th ACM Symposium on Information, Computer and Communications Security ASIACCS, 2010, 261-270.

* cited by examiner

REVOCABLE AND TRACEABLE BLOCKCHAIN REWRITES USING ATTRIBUTE-BASED CRYPTOSYSTEMS

CROSS-REFERENCE TO RELATED APPLICATIONS

This application claims priority to and the benefit of the filing of U.S. Provisional Patent Application No. 63/181,568, entitled "Revocable and Traceable Blockchain Rewrites Using Attribute-Based Cryptosystems", filed on Apr. 29, 2021, and the specification thereof is incorporated herein by reference.

STATEMENT REGARDING FEDERALLY SPONSORED RESEARCH OR DEVELOPMENT

This invention was made with government support under grant Nos. 1800088, 2028797, 1914635, and 1757207 awarded by the National Science Foundation; and grant No. A38 awarded by the Federal Aviation Administration. The government has certain rights in the invention.

BACKGROUND OF THE INVENTION

Embodiments of the present invention relate to a system for performing access control including revocation for transaction rewrites in blockchains.

In access control techniques, revocation is a problem that is easily motivated from a practical standpoint. A blockchain is an append-only ledger to which entities can post messages in a decentralized manner. A message can be a financial transaction, a smart contract, or any data that needs to be shared among several users, but whose provenance needs to be verified. At a high level, a block is a collection of multiple messages (also called transactions), and their hash digests. Usually, once a message has been written to the blockchain, the message is considered immutable and cannot be edited.

While blockchain edits or rewrites are not required in all applications, there is an important class of applications where editing messages written onto a blockchain is important. For instance, in the European Union ("EU"), the general data protection regulation ("GDPR"), Chapter 2, Article 17: "Right to erasure" and Article 19: "Notification obligation regarding rectification or erasure of personal data or restriction of processing", gives users or data subjects the right to request that their personal data be erased/edited by the person or entity collecting or publishing their data, per their request. The U.S. state of California passed the California Privacy Rights Act ("CPRA"), whose origins were laid out in the California Consumer Privacy Act (CCPA) in 2018.

Blockchain technology has widespread applications in healthcare, regulatory compliance and audit, record management, Internet of Things, and more. It is easy to envisage examples where a user's sensitive data is part of the committed blockchain transactions, and at a later point needs to be erased. For example, a global consortium of banks is currently using a blockchain platform to manage financial agreements, securities trading, etc. These transaction records will include clients' information and could potentially contain personally identifiable information.

As per the individual's "right to forget" (e.g., in GDPR), a user can request a purge of their identification data from the blockchain, (true even with encrypted data), and should be able to independently verify that the data has been purged. Also, when a blockchain is used for record keeping and auditing the actions of a set of mutually untrusting parties, there may be situations where a non-monetary record needs to be expunged from the blockchain, e.g., offensive content, leaked personal information/encryption keys, etc., and companies have prototyped editable blockchains for addressing this. The U.S. Department of Homeland Security in a recent report on the use of blockchains in government has judged permissioned blockchains to be useful for maintaining government records, supply chain monitoring, and government approval chain processes, which will encourage blockchain adoption. In all such applications, there may occasionally arise a need for correcting/updating transactions. There is thus a present need for a method and apparatus for providing revocable and traceable blockchain rewrites.

Recently, some solutions have been proposed to enable modifications of data posted to a blockchain. One method is a hard fork, which involves diverging the blockchain at the point where a message needs to be changed, creating a new forked blockchain, and invalidating all subsequent blocks in the old blockchain. Another technique is to modify a message m to m', post m' pointing to m on the blockchain. In addition to being inefficient, these techniques do not expunge the old message from the chain, and do not enable fine-grained control over who can modify messages.

A couple of editable options have been proposed, for example, one solution for blockchain edits is by rewriting entire blocks using chameleon hash functions. Another solution is a system for block-level rewrites where any user can propose a redaction or an edit of a block, which is then voted upon by other users, and the edit is accepted if it wins a majority vote. Coarse block-level solutions result in needlessly rewriting an entire block, when only a single transaction in a block needs to be expunged. In addition, coarse block-level solutions do not provide fine-grained transaction level control by helping set permissions about who can rewrite individual transactions. There is thus a present need for system which provides transaction-level rewriting, particularly a system wherein a transaction can be updated, if needed, at which point only the updated transaction is visible on the blockchain.

Recently, chameleon hash functions have been proposed to enable blockchain rewrites. Chameleon hash functions enable a user to find collisions in the domain of a hash function, such that several pre-images can be created that map to the same hash digest. The process of finding a collision on a given message, termed adapting the message, is done using a trapdoor associated with the digest. For increased security and flexibility, the idea of two trapdoors being associated with a digest, a permanent long-term trapdoor and an ephemeral trapdoor, which is chosen per message, has been proposed. However, a message cannot be adapted without knowing both trapdoors. Another known system proposed the use of an ephemeral trapdoor associated with a digest of a message posted on the blockchain that is encrypted using ciphertext-policy attribute-based encryption ("CPABE"), and only users possessing enough attributes that satisfy the policy can decrypt the ephemeral trapdoor and adapt a message. The problem with these methods and/or systems is that access to the ephemeral trapdoor, once issued, cannot be revoked, i.e., once given out, the ephemeral trapdoor is accessible to users in perpetuity. A perpetual trapdoor is of course not desirable as we would like to revoke such trapdoors once the edit has been made. For this reason, embodiments of the present invention preferably use chameleon hashes, attribute-based encryption ("ABE") and a dynamic group signature method and/or system to provide non-perpetual editing capabilities.

Motivated by the problem of performing transaction rewrites on a blockchain, the following questions should be asked:
1) Who gets to erase or overwrite transactions/messages?
2) What if a user is allowed to update a given message only for a short period of time?
3) Once a message has been modified, should the identity of the modifier be revealed?
4) If yes, to whom should the identity be revealed?

These questions need to be addressed to make editable transactions usable. Embodiments of the present invention preferably address three important challenges:
1) Revoking access to ephemeral trapdoors: a revoked user cannot update a message even if he/she has a local copy of the long-term and ephemeral trapdoors;
2) Revoking attributes from users: a user who no longer has access to an attribute secret key cannot update a message and/or trapdoor; and
3) Traceability: a user who anonymously rewrites a particular message, but violates the rewriting policy, can be identified.

For addressing the first two challenges, new cryptographic primitives are needed because existing ones do not provide the properties that are needed.

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

BRIEF SUMMARY OF EMBODIMENTS OF THE PRESENT INVENTION

Embodiments of the present invention relate to a method and computer software for improving the functionality of a computer operating on blockchain by enabling blocks containing editable records to be added to the blockchain, the method including creating a mutable record, a digest of the mutable record, along with a long-term trapdoor, an ephemeral trapdoor, and a plurality of tuples that regulate record edits, the mutable record having an immutable portion and an editable portion, modifying a hash verification function of the blockchain to perform verification of the mutable record, and modifying the blockchain such that when a block containing the mutable record is added to the blockchain, only the immutable portion of the mutable record is used in a block hash calculation. The method can also include onboarding an originator of the mutable record with attribute-issuing authority and signature-key issuing authority before creating the mutable record, the digest of the mutable record, the long-term trapdoor, the ephemeral trapdoor, and the plurality of tuples that regulate the record edits and/or prior to modifying the blockchain, establishing a set of authorized users, who can edit the mutable record by creating a record collision on the digest of the mutable record after the block containing the mutable record has been posted on the blockchain. In the method, creating the digest of the mutable record and the ephemeral trapdoor contained in the mutable record can include using a revocable chameleon hash algorithm to allow authorized users to edit the editable portion of the mutable record while keeping the immutable portion unchanged. The editable portion of the mutable record need not be selected from a predetermined list.

The method can further include providing access control of the ephemeral trapdoor and the long-term trapdoor—and providing access control can include using a revocable attribute-based encryption algorithm wherein a set of authorized administrators decides, grants and revokes record editing privileges. The method can also include updating the ephemeral trapdoor using a revocable chameleon hash algorithm.

In one embodiment, the immutable portion of the mutable record can include the long-term trapdoor and the digest of the mutable record. Preferably, the editable portion of the mutable record is not used in the block hash calculation. The method can also include providing a policy which spells out dynamic group signature system groups from which one or more users can anonymously sign a record edit and post it on the blockchain.

Embodiments of the present invention also relate to a computer readable medium having computer software stored thereon providing editing of records on a blockchain, including code allowing the creation of mutable record, a digest of the mutable record, a long-term trapdoor, an ephemeral trapdoor, and a plurality of tuples that regulate record edits wherein the mutable record comprises an immutable portion and an editable portion, code modifying a hash verification function of the blockchain to perform verification of the mutable record; and code modifying the blockchain, such that when a block containing the mutable record is added to the blockchain, for each mutable record in the block, only the immutable portion of the mutable record is used in a block hash calculation. The computer readable medium can also include code onboarding an originator of the mutable record with attribute-issuing authority and signature-key issuing authority before creating the mutable record, the digest of the mutable record, the long-term trapdoor, the ephemeral trapdoor, and the plurality of tuples that regulate the record edits. The computer readable medium can also include code which, prior to modifying the blockchain, establishes a set of authorized users, who can edit the mutable record by creating a collision on the digest of the mutable record after the block containing the mutable record has been posted on the blockchain. The code creating the digest of the mutable record and the ephemeral trapdoor contained in the mutable record can include code applying a revocable chameleon hash algorithm to allow authorized users to edit the editable portion of the mutable record while keeping the immutable portion unchanged. The code preferably does not require the editable portion of the mutable record to be selected from a predetermined list. The computer readable medium can also include code providing access control of the ephemeral trapdoor, and the code providing access control can include code using a revocable attribute-based encryption algorithm wherein a set of authorized administrators decides, grants and revokes record editing privileges. The computer readable medium can also include code updating the ephemeral trapdoor using a revocable chameleon hash algorithm. Preferably, the immutable portion can include the long-term trapdoor and the digest of the mutable record. The computer readable medium can also include code providing a policy which spells out dynamic group signature system groups from which one or more users can anonymously sign a record edit and post it on the blockchain. Preferably, the editable portion of the mutable record is not used in the block hash calculation.

Embodiments of the present invention provide:

1) a new revocable chameleon hash with ephemeral trapdoor method, hereinafter occasionally referred to as "RCHET", which guarantees that a revoked user cannot adapt a blockchain message or a trapdoor;
2) a new, efficient revocable ABE, occasionally referred to as "RFAME", to control access to the ephemeral trapdoor; and
3) a revocable and traceable blockchain rewriting framework, occasionally referred to as "ReTRACe", using the novel RCHET and RFAME method and/or systems, and a dynamic group signature method as building primitives. In ReTRACe, authorized users can adapt messages using the ephemeral trapdoor of a message's chameleon hash digest. Access to the ephemeral trapdoor can be revoked instantly as needed. Authorized users can anonymously post to and adapt messages on a blockchain, but their identities can be unmasked by legitimate oversight authorities if needed.

In one embodiment, ReTRACe does not modify the way miners communicate with one another and how the blocks are mined in a permissioned blockchain adapted with ReTRACe's functionality (except transaction verification). Both the ReTRACe messages and non-ReTRACe messages can co-exist in the underlying permissioned blockchain, i.e., after integrating ReTRACe into a permissioned blockchain, the resultant chain can accept mutable (messages with trapdoors controlled with ABE policies) as well as regular immutable messages such as financial transactions and records of payments between different entities.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Figure 1:
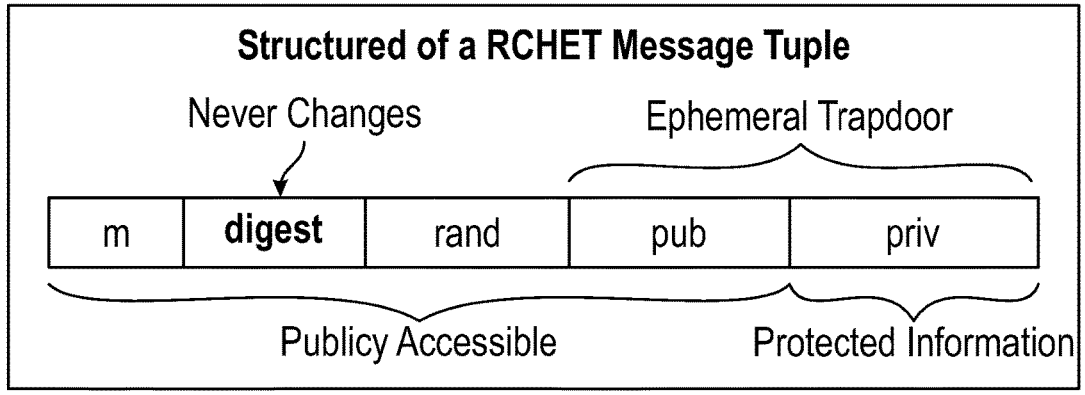
FIG. 1 is a drawing which illustrates the structure of a RCHET message tuple according to an embodiment of the present invention.

Embodiments of the present invention, occasionally referred to herein as "ReTRACe" relate to a blockchain transaction rewriting framework that builds on a novel revocable chameleon hash with ephemeral trapdoor and a novel revocable CP-ABE method/system. ReTRACe provides efficient and authorized transaction rewrites in blockchains, in addition to revocability and traceability of the users updating the transactions(s).

ReTRACe is preferably constructed using three primitives: 1) a revocable chameleon hash method and/or system, RCHET, which provides a dynamic and mutable ephemeral trapdoor required for updating a message posted on the blockchain ("BC"); 2) a revocable attribute-based encryption method and/or system, RFAME used to control access to the ephemeral trapdoor; and 3) a dynamic group signature method and/or system ("DGSS"), which helps legitimate users knowing the current ephemeral trapdoorto sign message updates anonymously before posting them to the blockchain. Both, RFAME and DGSS are preferably associated with policies.

As used throughout this application, the term "BC" is occasionally used to refer to a blockchain, the term "message" is used to mean a pre-image of the chameleon hash function, which is posted on the BC as a transaction, and the term "trapdoor", is used to mean the ephemeral trapdoor of the chameleon hash, unless otherwise specified. A chameleon hash function's output has mutable and immutable parts. The immutable part contains the digest of the hash function. The mutable part includes the trapdoor needed for creating a message collision, among other things.

In one embodiment, ReTRACe preferably includes four kinds of policies, all represented as Boolean predicates: 1) A trapdoor associated with the digest of a given message is encrypted under an ABE policy, $\gamma_{ABE}$; 2) The policy $\gamma_{GS}$ spells out certain DGSS groups from which users can anonymously sign a message update and post it on the BC; 3) For revoking access to the trapdoor, a policy, $\gamma_{ABEadmin}$, is provided which sets forth who can create an updated ephemeral trapdoor and encrypt it under a new policy, $\gamma_{ABE}'$; 4) Finally, $\gamma_{GSadmin}$ governs who can change $\gamma_{GS}$, and thus exclude users of certain DGSS groups from producing valid signatures.

For simplicity of exposition, the $\gamma_{ABEadmin}$ and $\gamma_{GSadmin}$ policies, once set, are preferably not changed (this preference can be relaxed on an as-needed basis by setting up a higher level of control). It is the $\gamma_{ABEadmin}$ and $\gamma_{GSadmin}$ policy clauses that are preferably immutable, i.e. the system preferably allows for the set of people satisfying them to be dynamic and ever-changing.

Unlike ABE methods, DGSS do not have the concept of policies built into them; this is preferably also the case for ReTRACe. A DGSS policy is preferably a publicly-known Boolean predicate linked to a message that specifies which groups can produce valid signatures on m, for example ($Y_{GS}$="Admin" AND "Payroll") indicates that users belonging to groups "Admin" and "Payroll" can produce valid signatures on m. In case of Boolean predicates with conjunctive clauses, the signatures ($\sigma$) and corresponding group public keys (gpk) are preferably collected into a set, $\xi_m$ where $\xi_m=(=\sigma_{admin} \text{ gpk}_{admin}),(\sigma_{payroll}, \text{gpk}_{payroll})$. Any public verifier can preferably check the validity of a set of signatures for a message with respect to a given policy.

The parties involved in ReTRACe can optionally be categorized into:
1) originator, which preferably creates a message, its digest and trapdoor, and sets four tuples $\gamma_{ABE}$, $\gamma_{GS}$, $\gamma_{ABEadmin}$, $\gamma_{GSadmin}$ that regulate further message updates;
2) a set of Authorized users ("AuthU"), which is a set of users who can create a collision on a message posted on the BC by the originator (AuthU can also optionally include the originator) as long as they possess enough attributes that satisfy $\Upsilon_{ABE}$, and are a member of DGSS group satisfying $\gamma_{GS}$; and
3) a set of Authorized user Administrators ("AuthUAdmins"), which is preferably a set of users who can modify the trapdoor, as well as create a collision on the message (AuthUAdmins can also include the originator), as long as they possess enough attributes to satisfy $\gamma_{ABEadmin}$ and are member of the DGSS group satisfying $\gamma_{GSadmin}$.
4) attribute-issuing authority and Group Manager: The attribute-issuing authority ("AIA") for the ABE system and/or method and the Group Manager ("GM") for the DGSS issue keys to their respective users. For presentation clarity, a single AIA and GM are described. However, in practice more can be used easily in ReTrace if desired.

A ReTRACe transaction preferably includes a mutable part (plaintext message, policies, trapdoor, ciphertexts, signatures, etc.) and an immutable part (digest). When a ReTRACe transaction is included in a block by the miners, only the immutable part of the ReTRACe transaction is preferably used in the Merkle tree of the given block instead of the hash of the whole transaction. This makes it possible to update a ReTRACe transaction in the future as long as the mutable part of the updated transaction verifies with the immutable digest on the BC. ReTRACe is preferably independent of the kind of underlying BC system, including the consensus mechanism, e.g., Proof of Work/Stake, as long as the security requirements for ReTRACe, as described further in this application, are preferably met. For a user to be able to post any ReTRACe messages in the BC, the user needs to be previously onboarded with an AIA and GM in the given ReTRACe system.

To use ReTRACe with a given BC system, the hash verification function of the BC is preferably modified to perform the ReTRACe messages' verification (miner verification and public verification of the ReTRACe messages). But ReTRACe preferably does not leak sensitive information to the miners, hence the miners are not onboarded by the AIA and GM. Adding or removing miners in the system using ReTRACe works preferably the same as any other BC system; the miners have a few extra steps when verifying updates to ReTRACe transactions, but none of those steps involve the miners learning privileged information about the messages posted on the BC.

Each block on a ReTRACe-modified BC could have mutable as well as immutable transactions and the resultant hash of the block is preferably always immutable as per the rules of traditional BCs. The verification algorithm can verify mutable as well as immutable transactions, thus ReTRACe can be implemented on a blockchain which supports both mutable and immutable transactions. Note that in one embodiment, once a transaction is written to the BC as immutable, it cannot be modified. In this embodiment, only transactions which were originally posted as ReTRACe transactions with a trapdoor and access policy are updatable. The AIA and GM are preferably publicly available to all users to sign up with if any user needs to post mutable transactions on the BC. The user preferably does not need to sign up with the AIA/GM if they do not want to post immutable transactions.

As in most BC-enabled systems, it is assumed that the consensus protocol being used ensures honest operation by miners. AIA is preferably assumed to honestly generate attributes and secret keys; this assumption can be relaxed by using multi-AIA techniques, where components of users' secret keys are generated by multiple AIAs. Similarly, for the DGSS, it can be assumed that the GM for a group will issue signing keys properly and trace users honestly. This assumption can be diluted by introducing a tracing manager and separating the roles of group and tracing managers. These relaxations can be applied on as as-needed basis.

In one embodiment, a primary goal of the treat model and security is to protect against adversaries that have no access to the long-term trapdoor and/or current version of the ephemeral trapdoor for a given message, m, posted on the BC, that do not satisfy the policies associated with m, yet who try to update m or its trapdoors. A second goal is to protect the privacy of, and provide anonymity to, the individuals who post a message or update a message and/or its trapdoor on the BC.

The security of ReTRACe is derived from time-tested, well-regarded assumptions based on the Discrete Log problem, the Decision Linear problem ("DLIN"), and the Decisional Diffie-Hellman ("DDH") problem. ABE access control policies can be modeled as Boolean formulas with AND and OR gates, where each input is associated with an attribute, and the Boolean formulas are represented as monotone span programs.

Consider a single AIA and GM in a system. Let [1 . . . n] represent a set of users, the AIA issues sets of secret keys $S_1, \ldots, SK_n$, and the GM issues sets of signing keys, $sk_1, \ldots, sk_n$ to the users. Let $mpk_{ABE}$ and gpk denote the public keys of the ABE and DGSS respectively.

Consider a user, u, who creates a message, m, to be posted on the BC. User u creates an adaptable (i.e., updatable) trapdoor T, that enables future modifications of m (using the RCHET method and/or system of the present invention), creates a policy, $\gamma_{ABE}$, which defines a set of authorized users, AuthU, that are allowed to modify m. User u encrypts with $mpk_{ABE}$ (using revocable ABE, RFAME of the present invention), $E_{mpk_{ABE}}(\tau, \gamma_{ABE}) \rightarrow Y$. For controlling who can update in the future, u picks an $r \leftarrow \$ \ Z_G$ (where G and GS=|G| are part of the public parameters and will be used in the cryptographic operations of ReTRACe). User u then creates the $\gamma_{admin}$ policy that defines the set of authorized user administrator(s), AuthUAdmins who are allowed to update τ and computes $E_{mpk_{ABE}}(r, \gamma_{ABEadmin}) \rightarrow X_r$. A user in AuthU updates m during a message adaptation, a user in AuthUAdmins updates m, X and $X_r$ during a trapdoor update.

User u also sets the DGSS policies, $\gamma_{GS}$ and $\gamma_{GSadmin}$, that stipulate only members of AuthU and AuthUAdmins are authorized to produce valid anonymous signatures on an updated message and updated trapdoor, respectively, before posting to the BC. Finally u posts tuple t=(m, X, $X_r$, $\gamma_{info}=(\gamma_{ABE}, \gamma_{GS})$, $\gamma_{admin}=(\gamma_{ABEadmin}, \gamma_{GSadmin})$) along with a signature on t to the BC. Optionally, standard techniques, which can include for example nonces/timestamps, can be used to prevent replay attacks.

In one embodiment, any user i∈[1 ... n], s.t. i∈AuthU whose secret key set∈SK {$SK_1, \ldots, SK_n$} satisfies $\gamma_{ABE}$, can optionally decrypt X, obtain τ, and update m to m' (using RCHET). Note that being able to satisfy $\gamma_{ABE}$ only allows i to decrypt the trapdoor τ and update m, but not update τ. User i preferably produces signature on m' using $sk_i$ that satisfies $\gamma_{GS}$, and post m' and the signature on the BC.

The digest of a given transaction preferably only corresponds to the m contained in it. The miner's verification function in ReTRACe ensures that only members of AuthU can update m and X, and only members of AuthUAdmins have permission to update m, X and $X_r$. The miners in ReTRACe do not need any extra or privileged information other than what is already available as part of the public parameters of ReTRACe, hence they do not need to sign up with the AIA or GM in the system.

Revocation of users from AuthU is preferably handled by either a member of AuthUAdmins updating $\gamma_{ABE}$ to $\gamma_{ABE}'$ (RFAME), or by the AIA/GM revoking individual users, in which case $\gamma_{ABE}$ is unchanged. Any user j∈[1 ... n], s.t. j∈AuthUAdmins whose secret key set $SK_i \in \{SK_i, \ldots, SK_n\}$ satisfies $\gamma_{ABEadmin}$, can decrypt Xr, obtain r, update τ to τ' (using RCHET), such that τ' will only be decryptable by non-revoked users (using RFAME for access control). User j will preferably compute $E_{mpkABE}(\tau',..) \rightarrow X'$, will prove knowledge of r to the miner thus proving it can satisfy $\gamma_{ABEadmin}$, and is a member of AuthUAdmins. User then preferably picks $r' \leftarrow \$ \ Z_q$, computes $E_{mpkABE}(\tau',..) \rightarrow X_r'$, to replace r. Then j will sign and post m', X', $X_r'$ on the BC. The DGSS signature will preferably be produced using j's signing keys, $sk_j$ that satisfy $\gamma_{GSadmin}$.

A revocable CHET "RCHET" method and/or system can be provided where the long-term trapdoor remains permanent, but access to the ephemeral trapdoor can be revoked at will. Intuitively, for performing revocation, the ephemeral trapdoor is preferably updated, and the revoked user is prevented from accessing the updated trapdoor.

Algorithms 1 depicts an algorithm for construction of an RCHET system and/or method that provides the construction of revocable chameleon hash with ephemeral trapdoors. The security of RCHET construction is based on the discrete log and DDH assumptions. At a high level, the idea is to hide the long-term and ephemeral trapdoors in the exponent of public parameters and use non-interactive zero knowledge proofs of knowledge ("NIZKPoKs") to prove knowledge of them. In the construction, Π is an IND-CCA2 public key encryption method, which is used to encrypt randomness associated with the trapdoors.

Algorithms 1:

RCHET Algorithms a) RCHET.systemSetup($1^\lambda$)→(pubpar): This algorithm generates the public parameters of the system:
1. ($\mathcal{G}$,g,g)←GGen($1^\lambda$). GGen generates prime-order cyclic group $\mathcal{G}$, g∈$\mathcal{G}$, q=|$\mathcal{G}$|.
2. Pick H's key, k∈$\mathcal{K}$, and crs→Gen($1^\lambda$), where $\mathcal{K}$ is the key-space of H. Set and return pubpar=(k,$\mathcal{G}$,g, q,crs). We assume pubpar is implicitly passed as input to all other algorithms.

b) RCHET.userKeySetup($1^\lambda$)→($sk_{ch}$,$pk_{ch}$): This algorithm generates the long-term trapdoor and a public key:
1. Pick x← $\mathbb{Z}^*$q, h←$g^x$, $\pi_{pk}$←NIZKPoK{x:h=$g^x$}, generate keys (SK,PK)←Π.KeyGen($1^\lambda$).
2. Set $pk_{ch}$=(PK,h,$\pi_{pk}$) and $sk_{ch}$=(SK,x). Return ($sk_{ch}$, $pk_{ch}$).

c) RCHET.cHash($sk_{ch}$,$pk_{ch}$,m)→{(digest,rand,$\Gamma_{pubinfo}$, $\Gamma_{privinfo}$), ⊥}: Creates a chameleon hash for a message m:
1. Check verify($\pi_{pk}$,h)$\stackrel{?}{=}$1, if not, return ⊥. Pick r, etd, d, δ← $\mathbb{Z}$q.
2. Compute h'←$g^{etd}$, D←$g^d$, and Δ←$g^\delta$. Do $\pi_t$←NIZKPoK{etd: h'=$g^{etd}$}, $\pi_D$←NIZKPoK{d: D=$g^d$}, πΔ←NIZKPoK{δ:Δ=$g^\delta$}.
3. Generate hash of message to be posted, a←$H_k$(m) and create chameleon hash parameters:

$$\beta \leftarrow \left(r + \frac{\delta}{x} + \frac{d}{x}\right), p \leftarrow h', b \leftarrow p \cdot h'^a.$$

Do $\pi_p$←NIZKPoK{r:p=$h^r$}. Do C←Π.Encrypt(PK, r), C'←Π.Encrypt(PK,a).
4. Return digest=(b,h',$\pi_t$,C,C'), rand=(β,p,$\pi_p$), $\Gamma_{pubinfo}$= (Δ,$\pi_\Delta$,D,$\pi_D$), $\Gamma_{privinfo}$=(δ,d,etd).

d) RCHET.verify Transaction($pk_{ch}$,m,digest,rand, $\Gamma_{pubinfo}$)→{0, 1}: This algorithm verifies the digest for a message m.
1. Check verify($\pi_{pk}$,h)$\stackrel{?}{=}$1, verify($\pi_p$,p)$\stackrel{?}{=}$1, verify($\pi_t$,h') $\stackrel{?}{=}$1, verify($\pi_D$,D)$\stackrel{?}{=}$1, and verify($\pi_\Delta$,Δ)$\stackrel{?}{=}$1.
2. Check $$b \stackrel{?}{=} \frac{h^\beta \cdot h'^a}{D \cdot \Delta},$$

where a←$H_k$(m). If check passes, return 1, else return 0.

e) RCHET.adaptMessage($sk_{ch}$,m,m',digest,rand,$\Gamma_{pubinfo}$, $\Gamma_{privinfo}$)→{rand', ⊥}: This algorithm updates a message m:
1. Decrypt a←Π.Decrypt(SK,C'), check a$\stackrel{?}{=}H_k$(m). Check $$b \stackrel{?}{=} \frac{h^b \cdot h'^{a'}}{D \cdot \Delta}.$$

If checks fail, return ⊥.
2. Check h$\stackrel{?}{=}g^x$, p$\stackrel{?}{=}g^{xr}$, h'$\stackrel{?}{=}g^{etd}$, D$\stackrel{?}{=}g^d$, and Δ$\stackrel{?}{=}g^\delta$. If checks fail, return ⊥.
3. Decrypt r←Π.Decrypt(SK,C), if r=⊥, return ⊥.
4. Compute a'←$H_k$(m').

$$r' \leftarrow \left(\frac{rx + a \cdot eid - a' \cdot etd + \delta}{x}\right).$$

5. Set p'=$h^{r'}$ and do $\pi_{p'}$←NIZKPoK{r':p'=$h^{r'}$}. Compute $$\beta' \leftarrow \left(r' + \frac{d}{x}\right).$$

Set and output rand'=(β',p',$\pi_{p'}$).

f) RCHET.adaptTrapdoor($sk_{ch}$,m,m',digest,rand,$\Gamma_{pubinfo}$, $\Gamma_{privinfo}$)→{(rand',$\Gamma_{pubinfo}$,$\Gamma_{privinfo}$), ⊥}: This algorithm modifies the trapdoor to an existing chameleon hash for a message m as follows:

1. Decrypt a←ΠDecrypt(SK,C'), check $a \stackrel{?}{=} H_k(m)$. Check $$b \stackrel{?}{=} \frac{h^b \cdot h^{a'}}{D \cdot \Delta}.$$

If checks fail, return ⊥.

2. Check $h \stackrel{?}{=} g^x$, $p \stackrel{?}{=} g^{xr}$, $h' \stackrel{?}{=} g^{etd}$, $D \stackrel{?}{=} g^d$, and $\Delta \stackrel{?}{=} g^\delta$. If checks fail, return ⊥.
3. Decrypt r→Π.Decrypt(SK,C), if r=⊥, return ⊥. Compute a'←$H_k$(m').
4. Pick d', $\delta' \leftarrow \mathbb{Z}^*q$. Compute $D' \leftarrow g^{d'}$, $\Delta' \leftarrow g^{\delta'}$, do $\pi_D \leftarrow$NIZKPoK$\{d':D'=g^{d'}\}$, $\pi_\Delta \leftarrow$NIZKPoK$\{\delta': \Delta'=g^{\delta'}\}$.
5. Set $$r' \leftarrow \left(\frac{rx + a \cdot eid - a' \cdot etd + \delta}{x}\right), p' \leftarrow h''$$

Compute $$\beta' \leftarrow \left(r' + \frac{d'}{x}\right), \pi_{p'} \leftarrow NIZKPoK\{r':p'=h''\}.$$

6. Prove knowledge of DDH tuple $(g, g^\delta, g^d, g^{\delta d})$. Set and output rand'=$(\beta',p',\pi_{p'})$, $\Gamma_{pubinfo}=(\Delta',\pi_{\Delta'},D',\pi_{D'})$, and $\Gamma_{privinfo}=(\delta',d',etd)$.

The properties of indistinguishability public and private collision resistance were introduced some time ago and retained in the industry. However, they have been strengthened in their security definition by giving the adversary access to an oracle for adapting messages in the private collision resistance game, while others only gave the adversary access to a hash oracle. Embodiments of the present invention provide further strengthened security properties by:

1) introducing the notion of revocation collision resistance, which any RCHET method and/or system should provide, and
2) giving the adversary access to oracles for both adapting messages and adapting trapdoors.

Informally, indistinguishability requires that an outsider, given a random string, rand, cannot tell if rand was obtained by hashing the original message, a message update or a trapdoor update. Public collision resistance requires that a user who possesses neither the long-term nor ephemeral trapdoor cannot find collisions by himself. Private collision resistance requires that even the holder of the long-term trapdoor cannot find collisions, as long as the ephemeral trapdoor is unknown to them. Revocation collision resistance requires that a user that knows both the long-term trapdoor and ephemeral trapdoor cannot find collisions after the ephemeral trapdoor has been updated, as long as the new ephemeral trapdoor is unknown to them. These security properties are formalized and give the proof of the following theorem.

Theorem: If the discrete log assumption and DDH assumption hold in G, is collision resistant, Π is IND-CCA2 secure, and the NIZKPoKs satisfy completeness, simulation soundness, extractability and zero knowledge, then our revocable chameleon hash with ephemeral trapdoors method and/or system, RCHET shown in Algorithm 1, is secure Most of the known benchmark methods and/or systems in ABE do not consider attribute revocation. Revocation model: In ABE there are, broadly speaking, two possible kinds of revocation. One is policy-level revocation, where revocation entails deleting a clause from an ABE policy, e.g., γ="CS students" and "EE staff" can be updated to a more restrictive policy, γ'="CS students". The other is the more fine-grained user-level revocation which calls for revoking decryption rights of individual users, e.g., if we do not wish to update γ, but revoke access of a member of staff from EE. Embodiments of the present invention allow for consideration of user-level revocation, but also support modifiable policies, if needed or desired.

Most of the known benchmark ABE methods do not support revocation. The ones that do are either based on non-standard assumptions, offer only selective security, are application-specific, do only policy-level revocation, do not support Type III pairings, need revocation lists which do not scale well, or perform inefficient revocation. Embodiments of the present invention provide an efficient revocable ABE method and/or system, RFAME, to revoke access to ephemeral trapdoors that provide desired properties.

Algorithms 2 illustrates construction of an embodiment of RFAME, which has security that is based on the DLIN assumption. Efficient Rekeying in RFAME: consider an AIA of an organization that issues four kinds of attributes, "Admin", "Payroll", "Benefits", and "Accounts". Assume there are unique users possessing each attribute, a total of 4 users in the system, and that there are three messages in the system encrypted under different policies: i) $Msg_1$ is encrypted under $\gamma_{Msg1}$ ("Admin" OR "Payroll"); ii) $Msg_2$ is encrypted under $\beta_{Msg2}$=("Payroll" OR "Benefits"); iii)$Msg_3$ is encrypted under $\gamma_{Msg2}$=("Benefits" OR "Accounts").

Algorithms 2:

RFAME Algorithms a) RFAME.SetupABE($1^\lambda$,U)→(mpk$_{ABE}$,msk$_{ABE}$): The algorithm first generates the group parameters (q, $\mathbb{G}$, $\mathbb{H}$, $\mathbb{G}$, e, g, h), picks $a_1,a_2,b_1,b_2,p_1,p_2 \leftarrow_\$ \mathbb{Z}_q^\ddagger, d_1, d_2, d_3 \leftarrow_\$ \mathbb{Z}_q$. It picks $\alpha_y \leftarrow_\$ \mathbb{Z}_q^\ddagger$, and computes $h^{\alpha_y}$ for each γ∈U. It sets mpk$_{ABE}$=(h,$H_1=h^{a_1}, H_2=h^{a_2}, T_1=e(g,h)^{p_1d_1a_1+d_3}$, $T_2=e(g,h)^{p_2d_2a_2+d_3}$, $h^{\alpha_{\gamma1}}, \ldots, h^{\alpha_{\gamma|U|}}$), and sets msk$_{ABE}$=(g,h,$a_1,a_2,b_1,b_2,p_1,p_2,d^{d_1},g^{d_2},g^{d_3},\alpha_{\gamma1} \ldots \alpha_{\gamma|U|}$).

b) RFAME.KeyGenABE(mpk$_{ABE}$,msk$_{ABE}$,$\gamma_1, \ldots, \gamma_{|U|}$)→SK: The algorithm generates the secret keys for all attributes γ∈U. Pick $r_1, r_2 \leftarrow_\$ \mathbb{Z}_q$. Compute sk$_0$= $(h^{b_1r_1}, h^{b_2r_2}, h^{r_1+r_2})$ For all γ∈U and t∈{1, 2}, pick $\sigma_\gamma, \sigma' \leftarrow_\$ \mathbb{Z}_q$, and compute:

$$sk_{y,t} = \mathcal{H}(y1t)^{\frac{b_1 r_1}{a_t + \alpha_y}} \cdot \mathcal{H}(y2t)^{\frac{b_2 r_2}{a_t + \alpha_y}} \cdot \mathcal{H}(y3t)^{\frac{r_1 + r_2}{a_t + \alpha_y}} \cdot g^{\frac{\sigma_y}{a_t + \alpha_y}} \cdot g^{\frac{\alpha_y}{a_t + \alpha_y}};$$

$$sk_{y,3} = (g^{-\alpha_y} \cdot g^{-\sigma_y})$$

$$sk'_t = \mathcal{H}(011t)^{\frac{b_1 r_1}{a_t}} \cdot \mathcal{H}(012t)^{\frac{b_2 r_2}{a_t}} \cdot \mathcal{H}(013t)^{\frac{r_1 + r_2}{a_t}} \cdot g^{\frac{\sigma'}{a_t}};$$

$$sk'_3 = (g^{d_3} \cdot g^{-\sigma'}), sk'' = g^{d_t p_t}$$

Set and return SK = ($sk_0, sk_{y,1}, sk_{y,2}, sk_{y,3}, sk'_1, sk'_2, sk'_3, sk''$)

c) RFAME.Encrypt(mpk$_{ABE}$,msg,(M,ρ))→C. Pick $s_1, s_2 \leftarrow_\$ \mathbb{Z}_q$. Let ρ(i) denote a mapping to the attributes i∈ I that satisfy a given policy Compute:

$ct_{\rho(i),1} = H_1^{s_1} \cdot (h^{\alpha_{\rho(i)}})^{s_1} = h^{s_1(a_1 + \alpha_{\rho(i)})}$ and similarly $ct_{\rho(i),2} = h^{s_2(a_2 + \alpha_{\rho(i)})}$, and set $$ct_0 = (ct_{0,1} = H_1^{s_1}, ct_{0,2} = H_2^{s_2}, ct_{\rho(i),1}, ct_{\rho(i),2}, ct_{0,3} = h^{s_1+s_2})$$

Assume M has $n_1$ rows and $n_2$ columns. Then, for each row, $i \in [1 \ldots n_1]$ and $l=1, 2, 3$, compute:

$$ct_{i,l} = \mathcal{H}(\rho(i)/l1)^{s_1} \cdot \mathcal{H}(\rho(i)/l2)^{s_2} \cdot \prod_{j=1}^{n_2} [\mathcal{H}(0j/l1)^{s_1} \cdot \mathcal{H}(0j/l2)^{s_2}]^{(M)_{i,j}};$$

$$\text{Set} \left| ct' = (T_1^{s_1} \cdot T_2^{s_2} \cdot msg) \right.$$

Set and output $C = (ct_0, ct_{i,l} \forall\, i \in [1 \ldots n_1], l \in \{1, 2, 3\}, ct')$ d) RFAME. Decrypt(SK,Cz,(M,φ))→{msg, ⊥}: Parse C as $(ct_0, ct_{i,l} \forall i \in [1 \ldots n_1], l \in \{1, 2, 3\}, ct')$. For each row $ct_{i,l} \in M$, pick coefficients $\gamma_i \in \{0, 1\}$ such that $$num = ct' \cdot e\left(\prod_{i \in I} ct_{i,1}^{\gamma_i}, sk_{0,1}\right) \cdot e\left(\prod_{i \in I} ct_{i,2}^{\gamma_i}, sk_{0,2}\right) \cdot e\left(\prod_{i \in I} ct_{i,3}^{\gamma_i}, sk_{0,3}\right)$$

$$den = \prod_{i \in I} e\left(sk_{\rho(i),1}^{\gamma_i} \cdot ct_{\rho(i),1}\right) \cdot$$

$$\prod_{i \in I} e\left(sk_{\rho(i),2}^{\gamma_i} \cdot ct_{\rho(i),2}\right) \cdot e\left(sk_3' \cdot \prod_{i \in I} sk_{\rho(i),3}^{\gamma_i} \cdot ct_{0,3}\right) \cdot \prod_{t \in \{1,2\}} e(sk_t' \cdot sk_t'', ct_{0,t})$$

e) RFAME.Revoke($mpk_{ABE}$, $msk_{ABE}$, v)→($mpk_{ABE}'$, $msk_{ABE}'$, SK'): Let a user holding attribute v ∈ U be revoked by the AIA. This algorithm is run by the AIA which generates new parameters for the non-revoked users of attribute group v, and updates its $mpk_{ABE}$ and $msk_{ABE}$. It picks $\beta_v \leftarrow \mathbb{Z}_q^{\ddagger}$, and computes $h^{\beta_v}$. It updates $$mpk'_{ABE} = (h, H_1, H_2, T_1, T_2, h^{\alpha_{y_1}}, \ldots, h^{\alpha_{y|U|-1}}, h^{\beta_v}).$$

The $msk_{ABE}$ remains the same except the $\alpha_v$ gets replaced with $\beta_v$. It then generates (a component of) the secret key for all non-revoked users possessing attribute v as follows:

$$sk_{v,t} = \mathcal{H}(v1t)^{\frac{b_1 r_1}{a_t + \beta_v}} \cdot \mathcal{H}(v2t)^{\frac{b_2 r_2}{a_t + \beta_v}} \cdot \mathcal{H}(v3t)^{\frac{r_1 + r_1}{a_t + \beta_v}} \cdot g^{\frac{\sigma_v}{a_t + \beta_v}} \cdot g^{\frac{\beta_v}{a_t + \beta_v}};$$

$$sk_{v,3} = (g^{-\beta_v} \cdot g^{-\sigma_v})$$

where $t \in \{1, 2\}$, and all other variables are as defined in the setupABE and KeyCenABE algorithms. Set SK'=($sk_0$, $sk_{v,t}$, $sk_{v,3}$, $sk_1'$, $sk_2'$, $sk_3'$, $sk''$). SK' is distributed only to the non-revoked users who possess attribute v.

Using current revocable CPABE methods and/or systems, if one user possessing the Admin attribute terminates employment, their secret key is preferably revoked by the AIA and the other γ–1 Admin users get rekeyed. $Msg^1$ needs to be re-encrypted to prevent the revoked user from decrypting it. Since Payroll is part of the $\gamma_{Msg1}$ policy, all y users holding Payroll get rekeyed, as $Msg_1$ got re-encrypted. Payroll users getting rekeyed results in $Msg_2$ needing to be re-encrypted. Consequently, users holding Benefits and Accounts attributes need to be rekeyed, and $Msg_3$ needs to get re-encrypted. In total, three re-encryptions and rekey 4γ–1 users are preferably performed for a single user revocation. In one embodiment, the present invention avoids such a domino effect.

At a high level, each attribute, attr is preferably associated with some unique randomness, r and r is imbedded into the secret keys of all users who possess attr. When a user possessing attr needs to be revoked, the randomness is preferably updated to r' and new secret keys are reissued with r' embedded in them only to the non-revoked users holding attr, and all ciphertexts whose policies involve attr are preferably re-encrypted. For facilitating this, the AIA can maintain a compact local table identifying which users possess a given attribute, a small storage cost in exchange for avoiding system-wide rekeying of users.

Furthermore, non-revoked users possessing attributes other than attr can still use their current keys to decrypt re-encrypted ciphertexts, which significantly reduces the number of users that need to be rekeyed and the ciphertexts that need to be re-encrypted. Embodiments of the present invention are flexible, in that they allow user-level revocation and do not impose any restrictions on policies.

Thus, RFAME handles revocation more efficiently. When a user possessing Admin gets revoked, only the other γ–1 users in Admin are rekeyed, and only $Msg_1$ needs to be re-encrypted to prevent the revoked user from decrypting it. In one embodiment, RFAME is a revocable CPABE method and/or system.

In summary, in the worst case, if x is the number of unique attributes in a system, y the number of users per attribute, then the overhead, using state-of-the-art revocation methods, is o(x) re-encryptions and o(xy)rekeyings. In RFAME, the overhead is Θ(1) re-encryptions and Θ(y) rekeyings. RFAME is CPA-secure, and is later turned into a CCA-secure method and/or system for ReTRACe. The IND-CPA is given game for RFAME and the proof of the following theorem: RFAME is fully IND-CPA secure under the DLIN assumption on Type III pairings in the random oracle model.

In one embodiment, a group signature method and/or system is preferably used for providing privacy and anonymity to users posting messages on the BC, yet retaining the ability to trace them if necessary. The group signature method and/or system can be easily replaced with a regular signature method and/or system in ReTRACe if anonymity is not required in the system. Group signature method and/or systems are based on three kinds of groups: static, semi-dynamic, and dynamic groups. Static groups do not support user addition or revocation, semi-dynamic groups support addition but not revocation, and dynamic groups allow addition and revocation. A dynamic group signature method and/or system (DGSS) is preferably used in ReTRACe. In one embodiment, DGSS is not constructed because existing constructions provide the properties that are needed. Thus, in one embodiment, ReTRACe is independent of any specific construction.

An embodiment of a detailed construction of the ReTRACe framework, having its various algorithms, is described in Algorithms 3A-D, 4A-B, 5, and 6. In the algorithms, M denotes the monotone span program representing an ABE policy, and ρ represents a mapping function that maps rows of M onto attributes. BC.write is used to denote a blockchain write operation. The Keygen, User-Setup, Sign, Verify, AdaptMessage algorithms are fairly self-explanatory. The salient features of the CreateMessage, VerifyMiner and Revoke User algorithms, which are more involved, are described in more detail below. A given implementation can optionally use standard techniques, for example, nonces and timestamps, to prevent against replay attacks.

Algorithm 3A:
ReTRACe.Keygen($1^\lambda$)

1: GSetup($1^\lambda$) → pubpar
2: GKGen(pubpar) → (out$_{GM}$, st$_{GM}$),
   where out$_{GM}$ = (mpk, info$_0$)
3: Set gpk = (pubpar, mpk), st$_{GM}$ is GM's state
4: RFAME.SetupABE($1^\lambda$, U) → (mpk$_{ABE}$, msk$_{ABE}$)
5: RCHET.cSetup($1^\lambda$) → param
6: RCHET.userKeySetup(param) → (sk$_{ch}$, pk$_{ch}$)
7: PubPar = ($\mathbb{G}$, g, q, pk$_{ch}$, mpk$_{ABE}$, gpk)
8: SecPar = (msk$_{ABE}$, st$_{GM}$)
9: return (SecPar, PubPar, sk$_{ch}$)

(a) ReTRACe: AIA/GM Setup

Algorithm 3B:
ReTRACe.UserSetup(SecPar, PubPar)

1: Get $\mathbb{L}$, the list of all groups in DGSS
   that current user needs to join, set GSK = ∅
2: For each group in $\mathbb{L}$, Run DGSS.Join get
   gsk, GSK = GSK ∪ gsk
3: RFAME.KeyGenABE(mpkABE, mskABE, y$_1$, ..., y$_{|U|}$) → SK
4: Retrieve sk$_{ch}$
5: return key = (GSK, SK, sk$_{ch}$)

(b) ReTRACe: System Setup for User

Algorithm 3C:
ReTRACe.Sign(GSK, m, YGS)

1: Pick $\mathbb{K}$, s.t., $\mathbb{K}$ ⊆ GSK, Y$_{GS}$($\mathbb{K}$) = 1
2: for gsk$^i$ ∈ $\mathbb{K}$, where i ∈ 1 ... |GSK| do
3: DGSS.Sign(gsk$^i$, i. info, m) → {σi, ⊥}
4: ξ = (σi, i.gpk) ∪ ξ
5: return ξ

(c) ReTRACe: Signing a Message

Algorithm 3D:
ReTRACe.Verify(PubPar, msg, ξmsg)

1: for (σ$_1$, 1 gpk) ∈ ξmsg do
2: if DGSS.VerifySignature(1 .gpk, 1 .info, msg, σ$_1$) $\stackrel{?}{=}$ 0, return 0
3: for (σ$_1$, 1 .gpk) ∈ ξY$_{info}$ do
4: if DGSS.VerifySignature(1 .gpk, 1 .info, Y$_{info}$, σ$_1$) $\stackrel{?}{=}$ 0, return 0
5: if RCHET.verifyTransaction(pk$_{ch}$, m, digest, rand, $\Gamma_{pubinfo}$) $\stackrel{?}{=}$ 1
6: return 1.

(d) ReTRACe: Verifying a Message

ReTRACe.CreateMessage: This algorithm (Algorithm 4A), is preferably run by the originator who first runs RCHET to create a digest and trapdoors for a message m. The originator sets $\gamma_{ABE}$, $\gamma_{GS}$ (for members of AuthU), and $\gamma_{ABEadmin}$ and $\gamma_{GSadmin}$ (for members of AuthUAdmins). The ephemeral trapdoor is encrypted under $\gamma_{ABE}$ to obtain X. The originator then picks an r ←\$ $Z_q$ and encrypts it under $\gamma_{ABEadmin}$ to obtain X$_r$. This ensures that only members of AuthUAdmins can decrypt r, and modify $\gamma_{ABE}$ and $\gamma_{GS}$. The originator creates a tuple, msg, with X and policy information, signs using his/her signing key(s) that satisfy $\gamma_{GS}$, and creates a set of signatures $\gamma_{info}$ with each signature bundled with its corresponding verification key. Finally, the originator signs $\gamma_{info}$ and sends the signature along with msg·ξ$_{msg}$·ξ$_{\gamma_{info}}$ to the miner.

ALGORITHM 4A

ReTRACe.CreateMessage(key, PubPar, m)

1: RCHET.cHash(sk$_{ch}$, pk$_{ch}$, m) →
   (digest, rand, $\Gamma_{pubinfo}$, $\Gamma_{privinfo}$)
2: RFAME.Encrypt(mpk$_{ABE}$, $\Gamma_{privinfo}$, (M$_{Y_{ABE}}$, ρ$_{Y_{ABE}}$)) → X
3: Create $\mathbb{Z}_{GS}$. Set Y$_{info}$ = (Y$_{ABE}$, Y$_{GS}$)
4: r ←\$ $\mathbb{Z}$*q, ω = g$^r$, π$_ω$ ← NIZKPoK{r : ω = g$^r$}
5: R.FAME.Encrypt(mpk$_{ABE}$, r, (M$_{Y_{ABEadmin}}$, ρ$_{Y_{ABEadmin}}$)) → X$_r$
6: Create Y$_{GSadmin}$
7: Set Y$_{admin}$ = (Y$_{ABEadmin}$, Y$_{GSadmin}$, X$_r$, ω, π$_ω$)
8: ReTRACe.Sign(GSK, Y$_{info}$, Y$_{GSadmin}$) → ξY$_{info}$
9: msg = (m, digest, rand, $\Gamma_{pubinfo}$, X, Y$_{info}$, Y$_{admin}$, ξY$_{info}$)
10: ReTRACe.Sign(GSK, msg, Y$_{GS}$) → ξ$_{msg}$
11: Call ReTRACe.VerifyMiner(PubPar, msg, ξ$_{msg}$, π$_ω$)
12: return (msg, ξ$_{msg}$)

(a) RETRACe: Creating a Message

ALGORITHM 4B

ReTRACe.AdaptMessage(key, PubPar, m', ξmsg)

1: if ReTRACE.Verify(PubPar, msg, ξmsg) $\stackrel{?}{=}$ 0
   return ⊥
2: RFAME.Decrypt(SK, X, (M$_{Y_{ABE}}$, ρ$_{Y_{ABE}}$)) → $\Gamma_{privinfo}$
3: RCHET.adaptMessage(sk$_{ch}$, m, m', digest, rand, $\Gamma_{pubinfo}$, $\Gamma_{privateinfo}$) → rand'
4: msg' = (m', digest, rand', $\Gamma_{pubinfo}$, X, Y$_{info}$, Y$_{admin}$, ξY$_{info}$)
5: ReTRACe.Sign(GSK, msg', Y$_{GS}$) → ξmsg'
6: if ReTRACe.VerifyMiner(PubPar, msg', ξmsg, ⊥) $\stackrel{?}{=}$ 0
   return ⊥
7: return (msg', ξmsg')

(b) ReTRACe: Updating a Message

ALGORITHM 5A

ReTRACe.RevokeUser(key, PubPar, m', msg, ξmsg)

1: if ReTRACe.Verify(PubPar, msg, ξmsg) $\stackrel{?}{=}$ 0
   return ⊥
2: RFAME.Decrypt(SK, X$_r$, (M$_{Y_{ABEadmin}}$, ρ$_{Y_{ABEadmin}}$)) → r
3: r' ←\$ $\mathbb{Z}$*q, ω' = g$^{r'}$. Set π$_{ω'}$ ← NIZKPoK{r': ω' = g$^{r'}$}
4: RFAME.Encrypt(mpk$_{ABE}$, r', (MYABEadmin, ρ$_{Y_{ABEadmin}}$)) → X$_r$'
5: Y'$_{admin}$ = (Y$_{ABEadmin}$, Y$_{GSadmin}$, X$_r$', ω', π$_{ω'}$)
6: RFAME.Decrypt(SK, X, (M$_{Y_{ABE}}$, ρ$_{Y_{ABE}}$)) → $\Gamma_{privinfo}$
7: RCHET.adaptTrapdoor(sk$_{ch}$, m, m', digest, rand, $\Gamma_{pubinfo}$, $\Gamma_{privinfo}$) → (rand', $\Gamma_{pubinfo}$, $\Gamma_{pubinfo}$)
8: RFAME.Encrypt(mpk$_{ABE}$, $\Gamma_{privinfo}$, (M$_{Y'_{ABE}}$, ρ$_{Y'_{ABE}}$)) → X'
9: Y'$_{info}$ = (Y'$_{ABE}$, Y$_{GS}$)
10: ReTRACe.Sign(GSK, Y'$_{info}$, Y'$_{GSadmin}$) → ξY'$_{info}$
11: msg' = (m', digest, rand', $\Gamma_{pubinfo}$, X', Y'$_{info}$ = (Y'$_{admin}$, ξY'$_{info}$)
12: ReTRACe.Sign(GSK, msg', Y$_{GS}$) → ξmsg'
13: Call VerifyMiner(PubPar, msg', ξmsg', π$_{ω'}$)
14: return (msg', ξmsg')

(a) ReTRACe: Revoke Case 1: Revoke Users by Updating Polices

ALGORITHM 5B

ReTRACe.RevokeUser(key, PubPar, m', msg, $\xi$msg)

1: if ReTRACe.Verify(PubPar, msg, $\xi$msg) $\overset{?}{=}$ 0
    return $\perp$
2: RFAME.Decrypt(, $X_r$, ($SK_{M_{YABEadmin}}$, $\rho_{Y_{ABEadmin}}$)) $\to$ r
3: r' $\leftarrow$ \$$\mathbb{Z}$*q, $\omega'$ = g$^{r'}$. Set $\pi_{\omega'}$ $\leftarrow$ NIZKPoK{r': $\omega'$ = g$^{r'}$}
4: RFAME.Encrypt(mpk$_{ABE}$', r', (MYABEadmin, $\rho_{Y_{ABEadmin}}$)) $\to$ $X_{r'}$
5: Y'$_{admin}$ = (Y$_{ABEadmin}$, Y$_{GSadmin}$, X$_{r'}$, $\omega'$, $\pi_{\omega'}$)
6: RFAME.Decrypt(SK, X, (M$_{YABE}$, $\rho_{YABE}$)) $\to$ $\Gamma_{privinfo}$
7: RCHET.adaptTrapdoor(sk$_{ch}$, m, m', digest, rand, $\Gamma_{pubinfo}$, $\Gamma_{privinfo}$) $\to$ (rand', $\Gamma'_{pubinfo}$, $\Gamma'_{pubinfo}$)
8: RFAME.Encrypt(mpk$_{ABE}$, $\Gamma'_{privinfo}$, (M$_{Y'ABE}$, $\rho_{Y'ABE}$)) $\to$ X'
9: msg' = (m', digest, rand', $\Gamma'$pubinfo, X', Y$_{info}$, Y'$_{admin}$, $\xi$Y'$_{info}$
10: ReTRACe.Sign(, msg', Y$_{GS}$) $\to$ $\xi$msg'
11: Call VerifyMiner(PubPar, msg', $\xi_{msg'}$, $\pi_{\omega'}$ )
    return (msg', $\xi_{msg'}$)

(b) ReTRACe: Revoke Case 2: AIA Revoking a Single User

ReTRACe.VerifyMiner: This algorithm (Algorithm 6) is preferably run only by miners to verify a message before posting it on the BC. If a message is being adapted ($\varsigma = \perp$), the miner does not do NIZK verifications. If a trapdoor is being adapted ($\varsigma = T$), the tuple submitted to the miner is an update to a pre-existing msg on the BC, and the $\omega$ used to verify the NIZK $\pi_\omega$ is obtained from the current msg on the BC. If a new message is being created ($\varsigma = \pi_\omega$), then the $\omega$ used to verify the NIZK $\pi_\omega$ is obtained from the msg tuple itself. In all cases, the miner checks if all signatures in $\xi_{msg}$ pass verification with respect to $\gamma_{GS}$ contained in the tuple msg, checks if all verifications in $\xi_{Y_{info}}$ pass verification with respect to $\gamma_{GSadmin}$ and the digest of msg is checked. If all checks pass, the tuple msg, along with the list of signatures on it, is written to the BC. Note that if ReTRACe is deployed in a BC that hosts both mutable and immutable transactions, then for immutable transactions the miner verification process is the same as in current BC systems.

Algorithm 6:
ReTRACe.VerifyMiner(PubPar,ms, $\xi$ms, $\zeta$)

1: for ($\sigma_l$, l. gpk) $\in$ $\xi$msg do
2:   if DGSS.VerifySignature(l. gpk, l. info, msg, $\sigma_1$ ) $\overset{?}{=}$ 0
3:   return 0
4: for ($\sigma_l$, l. gpk) $\in$ $\xi$Y$_{info}$ do
5:   if DGSS.VerifySignature(l. gpk, l. info, Y$_{info}$, $\sigma_1$ ) $\overset{?}{=}$ 0
  return 0
6: if $\zeta$ = $\pi\omega$
7: if verify($\omega$, $\pi\omega$) $\neq$ 1, return 0
8: if RCHET.verifyTransaction(pk$_{ch}$, m, digest, rand, $\Gamma_{pubinfo}$) $\overset{?}{=}$ 1
9: BC.write(msg, $\xi$msg, ) return 1
10: return 0

RETRACe: Miner Verifying a Message

ReTRACe.RevokeUser: This algorithm (Algorithms 5A and 5B) is preferably called by a member of AuthUAdmins either when they want to revoke clauses from the ABE policy, $\gamma_{ABE}$, or when the ephemeral trapdoor, or $\Gamma_{privinfo}$, needs to be re-encrypted in response to the AIA revoking a user. Both cases are preferably handled differently:

Case 1: Revoking a clause from $\gamma_{ABE}$: This algorithm (Algorithm 5B) is preferably run by a user v E AuthUAdmins who wants to modify a $\gamma_{ABE}$ associated with msg. The AIA/GM are not involved, and no algorithm from RFAME is called. User v first decrypts the trapdoor, $\Gamma_{privinfo}$, using his/her RFAME secret keys, v picks an r, and encrypts r' under $\gamma_{admin}$. This is to ensure that only non-revoked members of AuthUAdmins can decrypt r' and adapt the ephemeral trapdoor in the future. Next v adapts the ephemeral trapdoor. The new message and trapdoor are encrypted under a new policy, $\gamma_{ABE}$', which is a low-cost operation and involves no re-keying operations. We have not depicted the $\gamma_{GS}$ getting updated, for clarity of presentation. There are four exemplary cases:

1) If $\gamma_{ABE}$ changes to a more inclusive $\gamma_{ABE}$', the new user groups need to be present in $\gamma_{GS}$ as well;
2) If $\gamma_{ABE}$ changes to a more restrictive $\gamma_{ABE}$', the revoked users cannot decrypt the trapdoor and successfully adapt the message, so $\gamma_{GS}$ does not need to change;
3) If $\gamma_{GS}$ changes to a more restrictive $\gamma_{GS}$', such that the users satisfying $\gamma_{GS}$ were also a part of $\gamma_{ABE}$, $\gamma_{ABE}$ needs to change too, revoking the users from the ABE method and/or system; and
4) If $\gamma_{GS}$ changes to a more restrictive $\gamma_{GS}$', such that the users satisfying $\gamma_{GS}$' are not a part of $\gamma_{ABE}$, the new users cannot decrypt the trapdoor and successfully adapt the message, so $\gamma_{ABE}$ does not need to change. User v then signs the new $\gamma_{info}$' using their signing keys that satisfy Y$_{GSadmin}$; the signature set denoted as zi prime info. A new msg' is created and signed using a set of keys that satisfy $\gamma_{GS}$, and the resulting signature set is denoted by $\xi_{msg'}$. Finally, msg' and $\xi_{msg'}$ are given to the verifiers and who post them.

Case2: AIA revoking a user: This third algorithm (Algorithm 5A) is preferably run by a user v$\in$AuthUAdmins as soon as the AIA revokes user holding attribute $\gamma$ (which appears either $\gamma_{ABE}$ or $\gamma_{ABEadmin}$). First, the AIA updates its own public key from mpk$_{ABE}$ and mpk$_{ABE'}$ (which results in PubPar getting updated to PubPar'), and then issues SK only to the non-revoked users holding the attribute $\gamma$. User v then proceeds to adapt the ephemeral trapdoor $\Gamma_{privinfo}$, to prevent the revoked user from being able to perform any future message adaptations. User v then generates a new r', encrypts, etc. The rest of the steps are similar to Case 1.

Regarding the security properties of ReTRACe, indistinguishability, public, private, and revocation collision resistance are preferably provided. The first three properties were first introduced for any policy-based chameleon hash method and/or system. By giving the adversary the ability to adapt messages and revoke messages, the revocation collision resistance is defined and the first three security properties of ReTRACe are strengthened. Indistinguishability requires that it should be computationally infeasible for an adversary to distinguish whether the randomness associated with a given message was generated as a result of a CreateMessage, AdaptMessage or RevokeUser. Public collision resistance requires that an adversary who knows neither the long-term nor the ephemeral trapdoor cannot produce valid collisions even after seeing past adaptations of messages and trapdoors, even with access to some attributes, but not the complete attribute set that can decrypt the ephemeral trapdoor.

Private collision resistance requires that an adversary that knows the long-term trapdoor, but not ephemeral trapdoor of the RCHET method and/or system, cannot produce valid collisions, even with knowledge of past message and trapdoor adaptations. This property should hold even if he/she has access to a subset of attributes, but not the complete set of attributes needed to decrypt the current trapdoor. Revocation collision resistance requires that an adversary, who knows the long-term and ephemeral trapdoors and has valid attributes to decrypt the ephemeral trapdoor, cannot produce valid collisions if either the RFAME policy changed to exclude him/her, or the AIA revoked a subset of his/her attributes necessary to decrypt the trapdoor. The IND-CPA security of RFAME is proven. For example, the Fujisaki-Okamoto transform can be applied to convert RFAME to an IND-CCA2 secure method and/or system to accomplish the proof. Theorem: if RCHET is secure, RFAME is fully IND-CCA2 secure, and DGSS is a secure dynamic group signature method and/or system then ReTRACe is secure.

Implementation in Ethereum: ReTRACe can be plugged into existing blockchains (including but not limited to Ethereum) by updating cryptographic operations with equivalent ones in ReTRACe. For instance, in Ethereum the signature algorithm in the module "crypto/crypto.go" is preferably modified to use ReTRACe.Sign; "trie/trie.go" to use the digest of rewritable transactions at the leaves of the blocks' Merkle trees; ReTRACe.AdaptMessage and ReTRACe.RevokeUser is preferably added to the "ethclient" module and ReTRACe.VerifyMiner to the "miner/miner.go" module. Such modifications can be ported to Ethereum.

With ReTRACe-adapted Ethereum, an authorized user preferably updates a transaction using the chameleon hash and then submits it to the transaction pool. Using an embodiment of the present invention, the transactions are preferably updated with a binary flag ('0'←new; '1'←updated). A miner that picks up an updated transaction verifies the transaction using ReTRACe, verifies and updates the transaction in the block (the remaining transactions are preferably untouched), and propagates the block for consensus. At each node storing the BC, the block with the updated transaction replaces the old block post transaction-verification.

The cost of ReTRACe operations in Ethereum (in gas) are proportional to their computational cost. The exact cost of operations is dynamic, varying based on many factors (number of pending transactions, minimum cost, etc.). At the base computation level, ReTRACe scales linearly with an increasing number of attributes and users, which is highly desirable.

Referring now to FIG. 1, a message in RCHET preferably contains several components. The plain text message is represented in FIG. 1 as m. The digest, rand, pub, and priv components constitute the chameleon hash part of the message with the digest being the only permanent component of the message. The verification function in RCHET takes as input the public part of the rchet message namely, m, digest, rand, and pub and outputs a message confirming or rejecting the verification. The priv component of the message needs to be protected and should not be available to the public as it acts as the trapdoor for adapting the message and the trapdoor itself. By design, anyone with knowledge of priv can adapt the message and update m and rand to some m' and rand', such that the verification for the message would pass, or even adapt the trapdoor by changing pub and priv to some pub' and priv'. This allows authorized entities (with access to priv) to make changes to the message already in a block in the blockchain.

Figure 2:
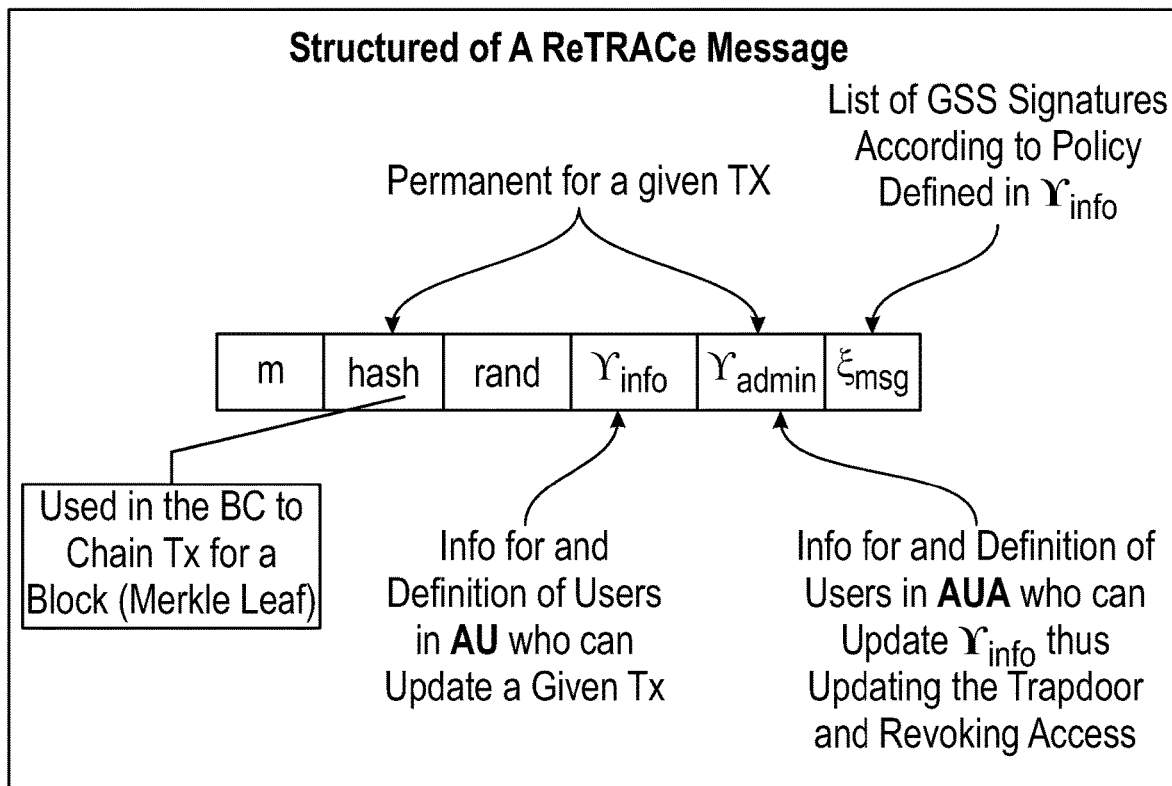
FIG. 2 is a drawing which illustrates the structure of a ReTRACe message according to an embodiment of the present invention.

As best illustrated in FIG. 2, ReTRACe preferably includes three major building blocks RCHET (Revocable Chameleon Hash), RFAME (Revocable CP-ABE), and the GSS for group signature. RCHET helps the transaction to be adaptable. RFAME helps control access to the revocable chameleon hash trapdoor associated with a given transaction. The GSS scheme is used to sign all ReTRACe transactions and updates to the transactions thus providing for privacy of the signer in the system but also allowing for traceability by an authority in case of malicious activity on part of the signer.

In conventional blockchains, hashes of entire transactions are used to build the Merkle root for a given block. But in the case of a Retrace adapted BC, only the hash component of a given ReTRACe transaction is used in the Merkle tree. The Priv component from RCHET message is preferably broken into $\gamma_{info}$ and $\gamma_{admin}$.

$\gamma_{info}$ contains information along with the ABE encrypted trapdoor giving access to authorized users ("AU") to carry out message adaptation. Similar to $\gamma_{info}$, $\gamma_{admin}$ contains ABE encrypted information giving access to AuthUadmins ("AUA"), authorized administrators to be able to adapt the trapdoor of a retrace transaction. A given ReTRACe system will preferably have three authorities, an Attribute issuing authority, AIA, associated with the RFAME process, a Group Manager ("GM"), and a Tracing Manager ("TM") associated with the GSS process. The GSS process provides anonymity for users while ensuring traceability of bad actors as a TM can be used to trace which member from a given GSS group produced a given set of signatures.

INDUSTRIAL APPLICABILITY

The invention is further illustrated by the following non-limiting examples.

Example 1

Figure 3:
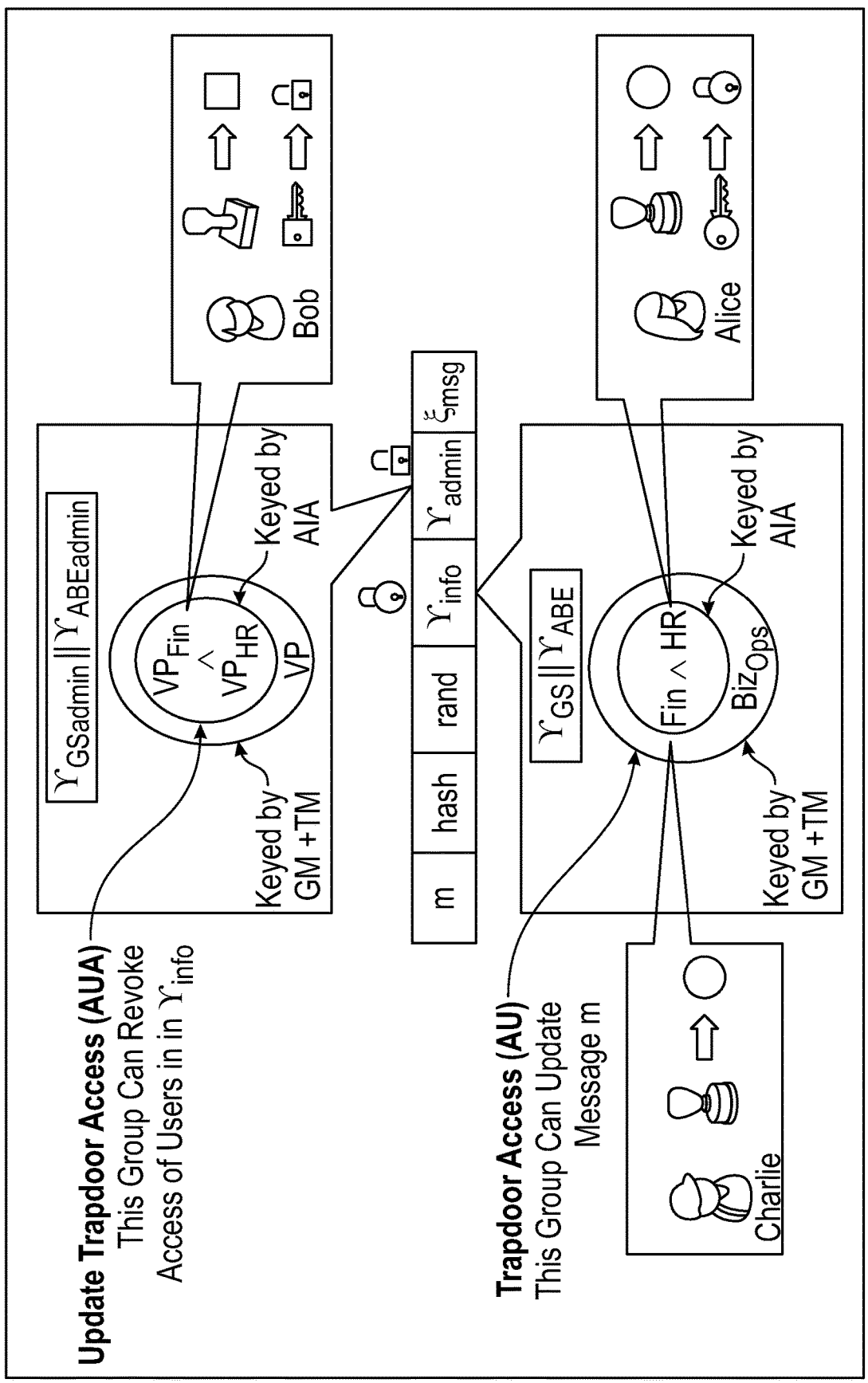
FIG. 3 is a drawing which graphically depicts group authorizations for a message and revocation of access to a trapdoor according to an embodiment of the present invention.
Figure 4B:
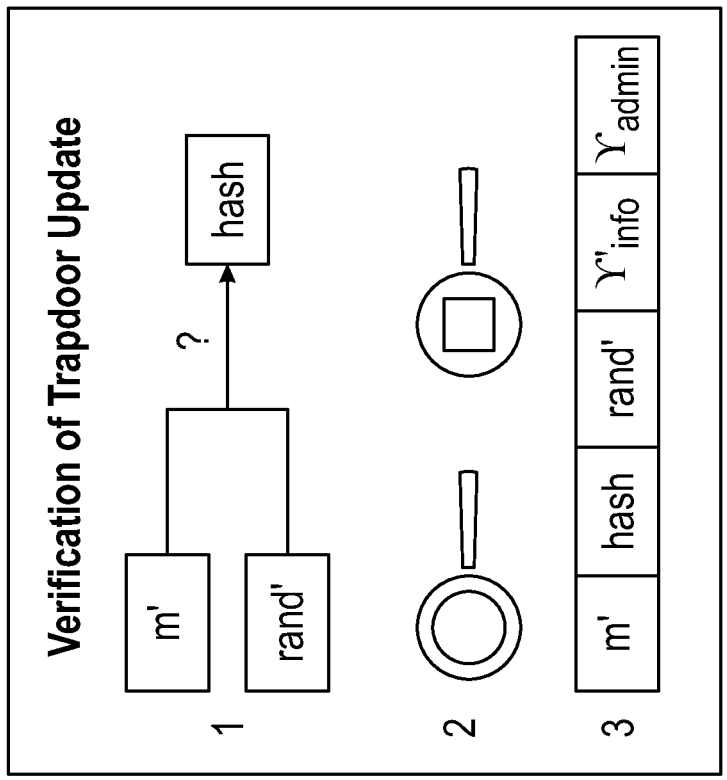
FIGS. 4A and 4B are drawings which respectively illustrate verification of a message update and verification of a trapdoor update according to an embodiment of the present invention.
Figure 4A:
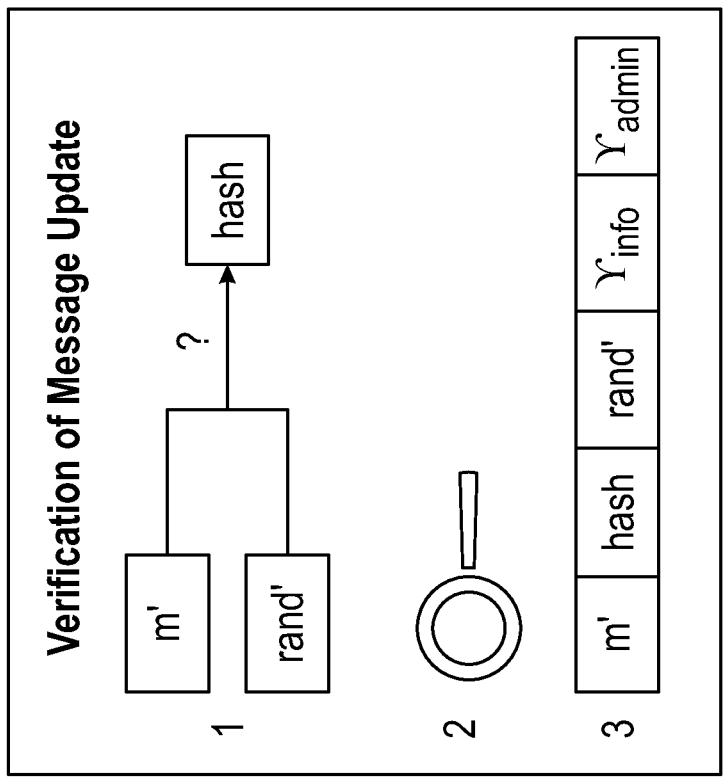
Figure 5:
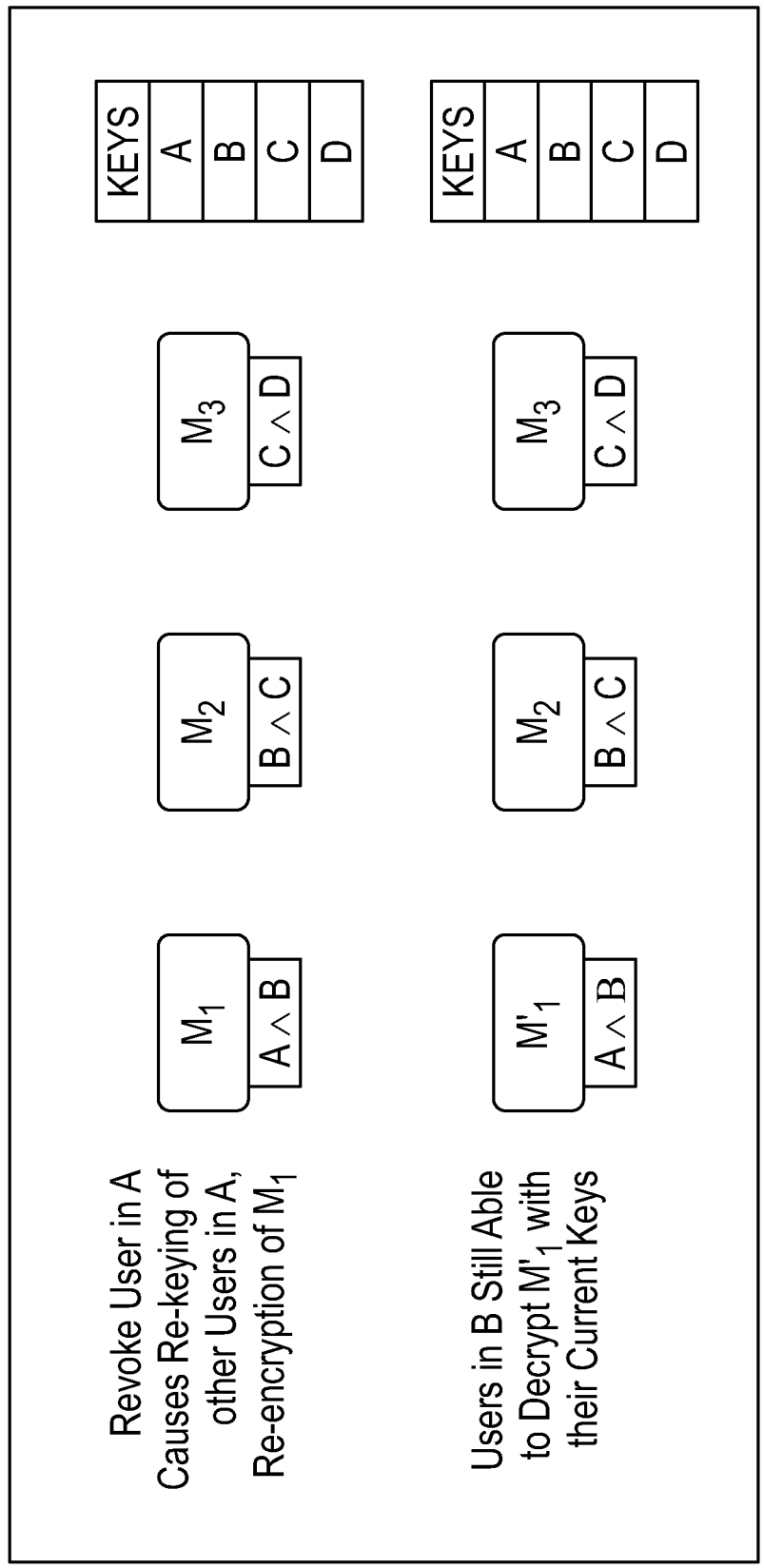
FIG. 5 is a drawing which graphically illustrates groups of users who do and do not need rekeying when a member of a group has his or her authorization revoked.

As a hypothetical use-case example, while referring to FIGS. 3-5, assume an organization that uses ReTRACe enabled BC to store records and update communication shared among multiple groups within the organization. Such an organization could be a County Assessor's Office recording land transactions; a judicial system storing records of court cases and their followups; a consortium of banks (e.g., R3 consortium) storing interbank transaction records. In each such case, there is an AIA, GM, and TM setup in the organization as part of the ReTRACe system. Each employee who interacts with the system is preferably given GSS keys as part of the GSS setup and might possess one or multiple attribute keys from the AIA according to their role(s) in the organization and the groups within.

Let us take a user, Alice, who operates within the Finance ("Fin") group as well as Human Resources ("HR"), hence possesses attribute keys for Fin and HR and signing keys under the $BIZ_{Ops}$ group in the GSS system. She creates a message 'm' containing some information that needs to be posted in the BC. She creates her ReTRACe transaction containing message m. She sets the $\gamma_{ABE}$ in $\gamma_{info}$ to (Fin$\wedge$HR) and $\gamma_{GS}$ to $BIZ_{Ops}$ so that she and other users in her role (members of AU for a given message), i.e., possessing both HR and Fin attributes can decrypt the trapdoor and update the message. She also sets the $\gamma_{ABEadmin}$ to ($VP_{Fin} \wedge VP_{HR}$) and $\gamma_{GSadmin}$ to (VP) defining requirements for AUA group, so that only the user(s) in the organization serving as VPs of Finance and the HR group can decrypt the trapdoor and update the $\gamma_{info}$ policy.

In this example, assume that Bob belongs to the group of VPs in the organization and possesses both $VP_{Fin}$ as well as $VP_{HR}$ attributes and signing keys under the VP group, hence Bob can update $\gamma_{info}$. However, a user, Charlie, in the organization who does possess signing keys under the $BIZ_{Ops}$ group, will not be able to update the message because he does not possess the attribute keys Fin and HR under the AIA. Once Alice has created the message, she sends it to the BC system and the miner verifies the message and it is posted.

Whenever the message needs to be updated, members of AU, like Alice, can decrypt the trapdoor, update the message to some m' and the transaction is sent to the miners for verification. The transaction is verified by the miners by checking the Chameleon hash and the group signature according to the $\gamma_{GS}$ defined in the message. If all verifications pass, then the message is updated in the BC.

If a user in AU, for example Alice, leaves her position in the finance group and hence loses her Fin attribute keys from the AIA, the AIA would revoke her key and update all other users' keys in the Finance group. At this point, the message will need to be update by another user in AU or AUA to update the trapdoor. This ensures that Alice cannot create any valid message adaptations since she will not have access to the newly updated trapdoor due to her revoked keys.

On the other hand, if there is a scenario where there is a restructure in the organization and the responsibility of maintaining the message gets shifted entirely to the HR group, members of AUA can update the $\gamma_{ABE}$ in the $\gamma_{info}$ accordingly and once again update the message trapdoor so that only the current members as defined in the $\gamma_{ABE}$ can access the trapdoor and adapt the message.

In both cases of trapdoor updates, the miners verify the signatures according to $\gamma_{GSadmin}$ to verify that the trapdoor adaptation was carried out by an authorized user.

The encrypted information contained within $\gamma_{info}$ along with the ABE policy enables users in AU, to update the message. Similar to $\gamma_{info}$, information in $\gamma_{admin}$ is preferably only available to users in AUA and enables them to update the trapdoor. For a user to produce a valid retrace transaction update, they need to have keys to the attribute groups defined in upsilon ABE, as well as the signing keys defined in the group signature policy (upsilon GS).

The small Venn diagrams in the call-out boxes for $\gamma_{info}$, and $\gamma_{admin}$ in FIG. 3 are used to illustrate group memberships, in this case, user Alice who has GSS keys for $Biz_{Ops}$ can create valid signatures and has access to trapdoor info to adapt message from having the Fin and HR attributes from AIA. However, another user, Charlie, who is also part of the $Biz_{Ops}$ group, cannot adapt the message even though he can produce valid signatures from the GSS membership since he does not have access to the trapdoor info (the extra key that Alice possesses).

Both message and trapdoor adaptations require verification on the miner's part before updating the given transaction on a block. The first check is a simple RCHET verification of the message hash and rand. The second step is to check that the group signatures, which are provided with the message update, satisfy the respective group signature policies defined in $\gamma_{info}$ and $\gamma_{ABEAdmin}$. A message adaptation in retrace results in m and rand components getting updated to m' and rand' while a trapdoor adaptation results in $\gamma_{info}$ also getting updated because it contains the trapdoor info. Just as a note, there are two kinds of trapdoor adapts in Retrace. Case 1 is when a policy on a retrace message is updated to eliminate trapdoor access for an entire attribute group. And Case 2 is when the trapdoor policy remains the same but a user in one of the attribute groups had their keys revoked and hence the trapdoor needs to be updated and re-encrypted with the new keys for the ABE process—this is discussed in more detail in the foregoing text of this application.

In RFAME, when a user is revoked from an attribute group and the message is re-encrypted with the new public key of the AIA, the attribute groups in the policy who were not revoked will still be able to decrypt the data with their original keys. This avoids the need to re-encrypt messages having policies with the revoked attribute group, here M2 and M3. But the re-encrypted data M1' cannot be decrypted with the old keys of the revoked attribute A. This is a high-level overview of the specific efficiency achieved by RFAME in the revoke operation when compared to the related work. We refer you to the paper for the detailed algorithms and the math supporting the scheme.

Example 2

RFAME, RCHET, and ReTRACe was implemented in Python 3, and Charm was used for cryptographic modules. All the experiments were carried out on a machine with 64 GB RAM and an Intel® Core™ i7-6700K CPU clocked at 4.00 GHz. RCHET and RFAME were implemented to compare their performance against CHET and FAME, respectively, to quantify the price of adding revocation. RFAME was not compared quantitatively with other revocable ABE methods and/or systems, since they do not provide the properties that RFAME provides. Using RCHET and RFAME, ReTRACe was implemented. Note that ReTRACe is the first system that provides transaction-level revocable blockchain rewrites, there is no equivalent state-of-the-art method and/or system to compare it with.

Figure 6A:
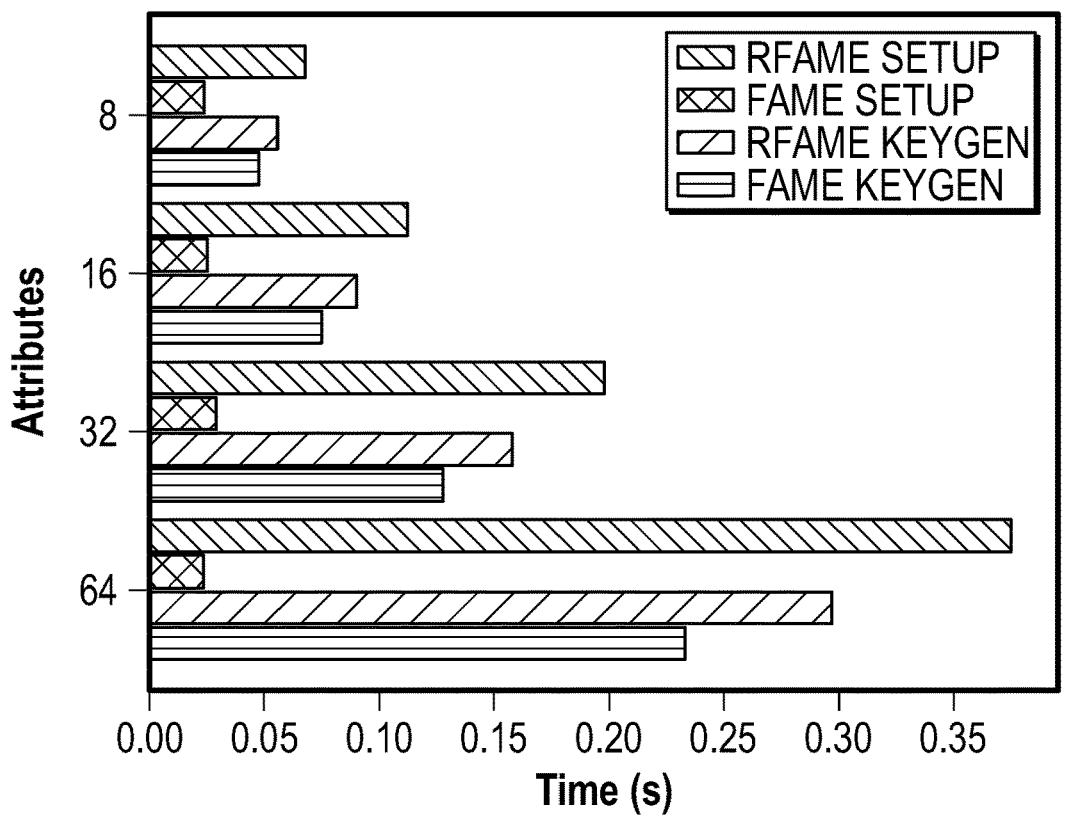
FIGS. 6A and B are graphs with respectively illustrate times for: key generation and setup (6A), and encryption and decryption (6B) as a function of the number of attributes for 80 users.
Figure 6B:
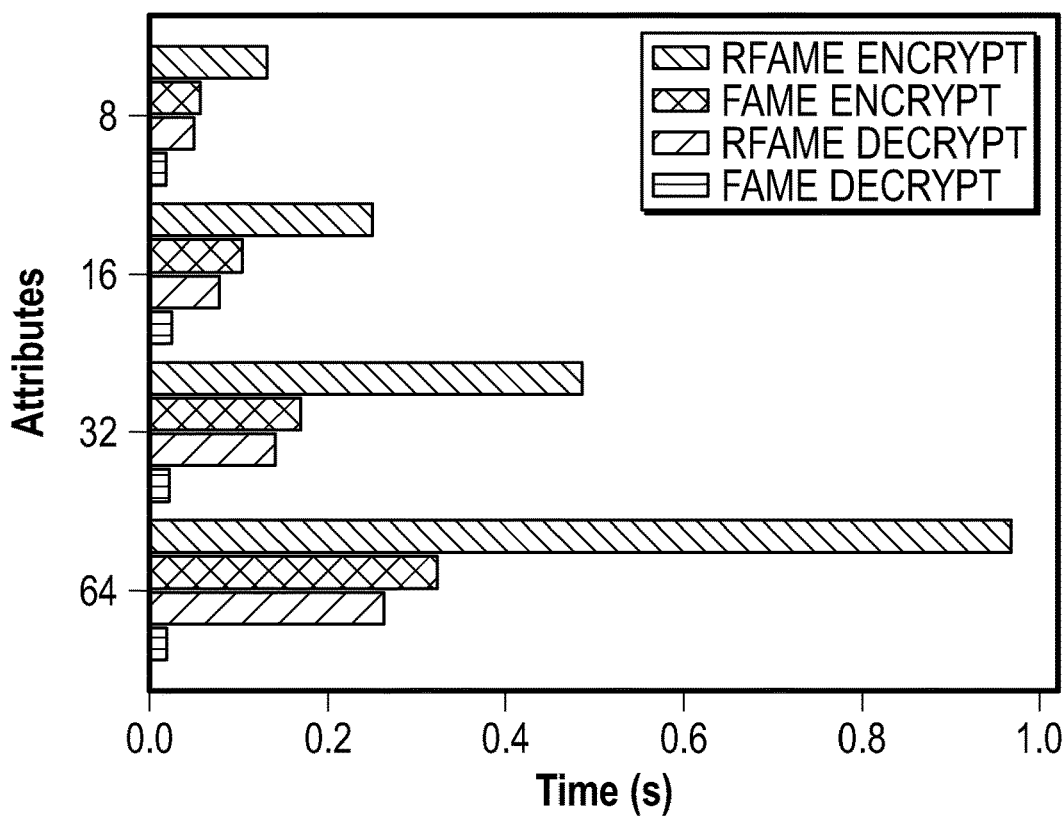

RFAME Results: We set our ABE policies to contain a total of 8, 16, 32 and 64 attributes, and all our policies have two equisized conjunctive clauses separated by a single disjunction. In each run, 10, 20, 40, or 80 users signed up with the AIA for each attribute. The computation time increased linearly with the number of users. So, for brevity, FIGS. 6A and 6B illustrate results for RFAME and FAME for 80 users per attribute only, with 6A illustrating key generation and setup times and with 6B illustrating encryption and decryption times. The setup times for RFAME w higher than for FAME because of the extra operations involved in computing the master public key ($mpk_{ABE}$) and master secret key ($msk_{ABE}$) during setup; and the growth of the public key size in RFAME was linear in the number of attributes (small-universe property).

In FAME, the size of one of the components of the ciphertext increased linearly in the number of attributes satisfying the given policy, whereas for RFAME there were two components whose size increased linearly, accounting for the difference in their encryption and decryption timings. For decryption, the number of pairing operations in RFAME was 6+2×(number of attributes satisfying a given policy), as compared to 6 pairing operations for FAME.

Table 1 shows the time taken when revoking one user from each attribute group with 10, 20, 40, and 80 users each, which resulted in the rekeying of the remaining users. The results were linear as expected because in each case 9, 19, 39, and 79 users got new keys, respectively. This trend is expected to continue as the number of users per attribute increases.

TABLE 1

| Timing for the RFAME.Revoke (time in secs) | |
| --- | --- |
| 10 Users per attribute | 0.115 |
| 20 Users per attribute | 0.2 |
| 40 Users per attribute | 0.364 |
| 80 Users per attribute | 0.714 |

As mentioned previously in the application, previously known methods do not provide efficient revocation. To carry out a user revocation under previously known methods, the entire system would have to be rekeyed using the Setup and Keygen functions, and all ciphertext re-encrypted regardless of whether the revoked user had access to the message or not. Thus, the cost in rekeying the users is significantly lower in RFAME, especially when the revoked user is in a single attribute group.

RCHET Results: Table 2 compares the running times for CHET and RCHET. In RCHET, when compared to CHET, one extra encryption and decryption, two NIZKPoK generation and verifications, and three modular exponentiations were added to all functions, except systemSetup and userKeySetup. Despite this, RCHET did not display a significant increase in latency, at the same time providing the ability to adapt the trapdoor of a message digest. The time difference between RCHET and CHET algorithms was in the order of milliseconds and this was a minimal trade-off for the added functionality that RCHET provided.

TABLE 2

Comparison of RCHET vs. CHET [10] (time in secs)

| Algorithm | CHET | RCHET |
| --- | --- | --- |
| Setup | 0.537 | 0.5369 |
| Chash | 0.0216 | 0.0234 |
| Verify | 0.000697 | 0.000967 |
| Adapt Message | 0.0414 | 0.0415 |
| Adapt Trapdoor | — | 0.04305 |

ReTRACe Results: ReTRACe was implemented with the DGSS policies being the same as the ABE policies and containing 20 users per attribute for 8 and 16 attributes. Except for the RFAME revocation component, whose running time is proportional to the number of users, the rest of the cryptographic primitives, i.e., DGSS, RCHET, and other RFAME algorithms, are independent of the number of users in the system. The running time for operations in ReTRACe were found to increase linearly with the number of users per attribute, as illustrated in the RFAME results.

Table 3 shows the timings of ReTRACe, with 20 users/attribute and messages with policies containing 8 and 16 attributes respectively. UserSetup and Keygen take significantly more time than the other functions as expected; both these functions involve all users in the system and are run only once at the beginning during system and users' setup. CreateMessage, Sign, Verify, and VerifyMiner were run more frequently, and all had sub-second timings. For testing Case 1 of ReTRACe.RevokeUser, we eliminated one attribute from $\gamma_{ABE}$, and in Case 2 we revoked one user from the AIA that held an attribute in $\gamma_{ABE}$. Case 2 took longer because it included the AIA's operations for revoking a user from one attribute group and rekeying of the rest of the users in the same group, whereas Case 1 just changed the message policy and updated the message trapdoor.

TABLE 3

ReTRACe running time, 20 users/attribute (secs)

| ReTRACe Algorithms | 8 Attr | 26 Attr |
| --- | --- | --- |
| UserSetup and Keygen (for 20 users) | 2.997 | 4.694 |
| CreateMessage | 0.473 | 0.963 |
| Sign | 0.0904 | 0.180 |
| Verify | 0.114 | 0.232 |
| Verify Miner | 0.225 | 0.460 |

TABLE 3-continued

ReTRACe running time, 20 users/attribute (secs)

| ReTRACe Algorithms | 8 Attr | 26 Attr |
| --- | --- | --- |
| AdaptMessage | 0.0928 | 0.152 |
| RevokeUser (Case1) | 0.545 | 1.015 |
| RevokeUser (Case 2) (for 19 users) | 0.676 | 1.049 |

The preceding examples can be repeated with similar success by substituting the generically or specifically described components and/or operating conditions of embodiments of the present invention for those used in the preceding examples.

Optionally, embodiments of the present invention can include a general or specific purpose computer or distributed system programmed with computer software implementing steps described above, which computer software may be in any appropriate computer language, including but not limited to C, C++, FORTRAN, BASIC, Java, Python, Linux, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements. One or more processors and/or microcontrollers can operate via instructions of the computer code and the software is preferably stored on one or more tangible non-transitive memory-storage devices.

Note that in the specification and claims, "about", "approximately", and/or "substantially" means within twenty percent (20%) of the amount, value, or condition given. All computer software disclosed herein may be embodied on any non-transitory computer-readable medium (including combinations of mediums), including without limitation CD-ROMs, DVD-ROMs, hard drives (local or network storage device), USB keys, other removable drives, ROM, and firmware.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for editing records on a blockchain comprising:

creating a mutable record, a digest of the mutable record, along with a long-term trapdoor, an ephemeral trapdoor, and a plurality of tuples that regulate record edits;

the mutable record comprising an immutable portion and an editable portion, the immutable portion comprising the long-term trapdoor and the digest of the mutable record;

modifying a hash verification function of the blockchain to perform verification of the mutable record; and modifying the blockchain such that when a block containing the mutable record is added to the blockchain, only the immutable portion of the mutable record is used in a block hash calculation.

2. The method of claim 1 further comprising onboarding an originator of the mutable record with attribute-issuing authority and signature-key issuing authority before creating the mutable record, the digest of the mutable record, the long-term trapdoor, the ephemeral trapdoor, and the plurality of tuples that regulate the record edits.

3. The method of claim 1 further comprising, prior to modifying the blockchain, establishing a set of authorized users who can edit the mutable record by creating a record collision on the digest of the mutable record after the block containing the mutable record has been posted on the blockchain.

4. The method of claim 1 wherein creating the digest of the mutable record and the ephemeral trapdoor contained in the mutable record comprises using a revocable chameleon hash algorithm to allow authorized users to edit the editable portion of the mutable record while keeping the immutable portion unchanged.

5. The method of claim 1 wherein the editable portion of the mutable record need not be selected from a predetermined list.

6. The method of claim 1 further comprising providing access control of the ephemeral trapdoor and the long-term trapdoor and wherein providing access control comprises using a revocable attribute-based encryption algorithm wherein a set of authorized administrators decides, grants and revokes record editing privileges.

7. The method of claim 1 further comprising updating the ephemeral trapdoor using a revocable chameleon hash algorithm.

8. The method of claim 1 further comprising providing a policy which spells out dynamic group signature system groups from which one or more users can anonymously sign a record edit and post it on the blockchain.

9. A non-transitory computer readable medium comprising computer software stored thereon providing editing of records on a blockchain comprising:

code allowing the creation of mutable record, a digest of the mutable record, a long-term trapdoor, an ephemeral trapdoor, and a plurality of tuples that regulate record edits wherein the mutable record comprises an immutable portion and an editable portion, the immutable portion comprising the long-term trapdoor and the digest of the mutable record;

code modifying a hash verification function of the blockchain to perform verification of the mutable record; and code modifying the blockchain, such that when a block containing the mutable record is added to the blockchain, for each mutable record in the block, only the immutable portion of the mutable record is used in a block hash calculation.

10. The computer readable medium of claim 9 further comprising code onboarding an originator of the mutable record with attribute-issuing authority and signature-key issuing authority before creating the mutable record, the digest of the mutable record, the long-term trapdoor, the ephemeral trapdoor, and the plurality of tuples that regulate the record edits.

11. The computer readable medium of claim 9 further comprising code which, prior to modifying the blockchain, establishes a set of authorized users who can edit the mutable record by creating a collision on the digest of the mutable record after the block containing the mutable record has been posted on the blockchain.

12. The computer readable medium of claim 9 wherein code creating the digest of the mutable record and the ephemeral trapdoor contained in the mutable record comprises code applying a revocable chameleon hash algorithm to allow authorized users to edit the editable portion of the mutable record while keeping the immutable portion unchanged.

13. The computer readable medium of claim 9 wherein the code does not require the editable portion of the mutable record to be selected from a predetermined list.

14. The computer readable medium of claim 9 wherein said computer readable medium further comprises code providing access control of the ephemeral trapdoor and wherein the code providing access control comprises code using a revocable attribute-based encryption algorithm wherein a set of authorized administrators decides, grants and revokes record editing privileges.

15. The computer readable medium of claim 9 further comprising code updating the ephemeral trapdoor using a revocable chameleon hash algorithm.

16. The computer readable medium of claim 9 further comprising code providing a policy which spells out dynamic group signature system groups from which one or more users can anonymously sign a record edit and post it on the blockchain.

* * * * *